US012783271B2

(12) United States Patent
Ji

(10) Patent No.: US 12,783,271 B2
(45) Date of Patent: Nov. 3, 2026

(54) STORAGE DEVICE AND ELECTRONIC SYSTEM

(71) Applicant: SAMSUNG ELECTRONICS CO., LTD., Suwon-si (KR)

(72) Inventor: Sooyoung Ji, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 992 days.

(21) Appl. No.: 17/811,336

(22) Filed: Jul. 8, 2022

(65) Prior Publication Data

US 2023/0126685 A1 Apr. 27, 2023

(30) Foreign Application Priority Data

Oct. 27, 2021 (KR) ........................ 10-2021-0144308

(51) Int. Cl.
*G06F 3/06* (2006.01)
*G06F 9/455* (2018.01)

(52) U.S. Cl.
CPC ........ *G06F 9/45558* (2013.01); *G06F 3/0604* (2013.01); *G06F 3/0659* (2013.01);
(Continued)

(58) Field of Classification Search
CPC .. G06F 9/45558; G06F 3/0604; G06F 3/0659; G06F 3/0664; G06F 3/0679;
(Continued)

(56) References Cited

U.S. PATENT DOCUMENTS 9,208,181 B2 12/2015 Pandey et al.
9,904,480 B1 2/2018 Singh et al.
(Continued)

FOREIGN PATENT DOCUMENTS

KR 10-2019-0113479 A 10/2019

OTHER PUBLICATIONS

Janki Bhimani et al. "FIOS: Feature Based I/O Stream Identification for Improving Endurance of Multi-Stream SSDs", 2018. (Year: 2018).*

(Continued)

*Primary Examiner* — Pierre Vital
*Assistant Examiner* — Abdou K Seye
(74) *Attorney, Agent, or Firm* — Morgan, Lewis & Bockius LLP

(57) ABSTRACT

An electronic system includes: a host configured to run a plurality of virtual machines; and a storage device including a plurality of memory regions and configured to divide data from the host into a plurality of streams and separately store the plurality of streams in the plurality of memory regions. The storage device assigns a first stream identifier (ID) to a first virtual machine, among the plurality of virtual machines, in response to a check-in snapshot command of the first virtual machine, and stores data in a first memory region corresponding to the first stream ID, among the plurality of memory regions, in response to a write command of the first virtual machine. The storage device stores snapshot management information including the logical addresses of the data in response to a check-out snapshot command from the first virtual machine and releases the assignment of the first stream ID.

19 Claims, 16 Drawing Sheets

(52) U.S. Cl.
CPC .......... *G06F 3/0664* (2013.01); *G06F 3/0679* (2013.01); *G06F 2009/45583* (2013.01)

(58) Field of Classification Search
CPC ......... G06F 2009/45583; G06F 3/0619; G06F 3/0631; G06F 3/061; G06F 12/0246; G06F 12/1009; G06F 2212/1016; G06F 2212/7201
See application file for complete search history.

(56) References Cited

U.S. PATENT DOCUMENTS

| | | | | |
|---|---|---|---|---|
| 10,067,837 | B1 | 9/2018 | Natanzon et al. | |
| RE47,852 | E | 2/2020 | Kotagiri et al. | |
| 10,564,853 | B2 | 2/2020 | Linkovsky et al. | |
| 10,656,838 | B2 | 5/2020 | Yang et al. | |
| 10,908,835 | B1 * | 2/2021 | Patel | G06F 11/1451 |
| 2017/0075614 | A1 * | 3/2017 | Kanno | G06F 3/0679 |
| 2018/0024744 | A1 * | 1/2018 | Kim | G06F 3/0688 711/103 |
| 2018/0113622 | A1 | 4/2018 | Sancheti | |
| 2019/0258529 | A1 * | 8/2019 | Moldvai | G06F 9/5016 |
| 2020/0125459 | A1 | 4/2020 | Bansal et al. | |
| 2020/0192579 | A1 | 6/2020 | Cavilla et al. | |
| 2021/0034396 | A1 * | 2/2021 | Denny | G06F 11/1435 |
| 2021/0056002 | A1 | 2/2021 | Ashraf et al. | |
| 2021/0200641 | A1 | 7/2021 | Bafna et al. | |
| 2021/0263762 | A1 * | 8/2021 | Kachare | G06F 12/0862 |

OTHER PUBLICATIONS

Julia Palmer, "Hype Cycle for Storage and Data Protection Technologies, 2020", Published Jul. 6, 2020.
Office Action dated Feb. 4, 2026 issued in corresponding to Korean Patent Application No. 10-2021-0144308.

* cited by examiner

231

| Stream ID | 1 | 2 | 3 | 4 |
|---|---|---|---|---|
| Allocated | VM1 | VM2 | X | X |

FIG. 6

STORAGE DEVICE AND ELECTRONIC SYSTEM

CROSS-REFERENCE

This application claims benefit of priority under 35 U.S.C. § 119 to Korean Patent Application No. 10-2021-0144308 filed on Oct. 27, 2021 in the Korean Intellectual Property Office, the disclosure of which is herein incorporated by reference in its entirety.

FIELD

The present disclosure relates to a storage device and an electronic system.

DISCUSSION

Storage devices using semiconductor memory may have different characteristics than electro-mechanical hard disk drives (HDD), such as absence of moving mechanical parts, higher data access speeds, stability, durability, and low power consumption. Storage devices having such advantages may include a universal serial bus (USB) memory device, a memory card having various interfaces, a solid-state drive (SSD), and the like.

Semiconductor memory devices may be classified into volatile memory devices and nonvolatile memory devices. Volatile memory devices may have high read and write speeds, but lose data stored therein when power supplies thereof are interrupted. In contrast, nonvolatile memory devices retain data stored therein even when power supplies thereof are interrupted. Nonvolatile memory devices may be used to store data to be retained regardless of whether power is supplied or interrupted.

Unlike an electro-mechanical hard disk drive, a nonvolatile memory device need not support an overwrite operation. Instead, the nonvolatile memory device may store updated data in a new location and manage its memory address through a flash translation layer (FTL). In addition, since the nonvolatile memory device need not support an overwrite operation, the nonvolatile memory device may provide free blocks through an erase operation. The nonvolatile memory device may periodically perform a garbage collection operation to create free blocks.

When a garbage collection operation is performed too frequently, performance of the storage device may be affected and the nonvolatile memory device may deteriorate due to a write amplification (WA) phenomenon. To reduce the impact of garbage collection and write amplification, the storage device may provide a multistream function to divide data into a plurality of streams and to separately store the plurality of streams in a plurality of memory regions.

SUMMARY

Embodiments of the present disclosure may provide configurations and operations associated with a storage device providing a multistream function.

Embodiments of the present disclosure may support snapshot operation of a plurality of virtual machines using multistream storage.

Embodiments of the present disclosure may prevent write amplification of a storage device by separately storing a plurality of pieces of data of virtual machines in a nonvolatile memory.

Embodiments of the present disclosure may support a rapid and accurate snapshot operation by decreasing the amount of data transfer between a host and a storage device when a virtual machine performs a snapshot operation.

Embodiments of the present disclosure may support snapshot operations of a plurality of virtual machines using a limited number of stream identifiers (IDs) of a storage device.

To facilitate description, embodiments of the present disclosure are provided in the context of examples, without imitation thereto.

According to an embodiment, an electronic system includes: a host configured to run a plurality of virtual machines; and a storage device including a plurality of memory regions and configured to provide a multistream function of dividing data from the host into a plurality of streams and separately storing the plurality of streams in the plurality of memory regions. The storage device assigns a first stream identifier (ID) to a first virtual machine, among the plurality of virtual machines, in response to a check-in snapshot command of the first virtual machine, and stores data in a first memory region corresponding to the first stream ID, among the plurality of memory regions, in response to a write command of the first virtual machine. The first virtual machine provides a check-out snapshot command to the storage device and generates first snapshot information indicating logical addresses of the data. The storage device stores snapshot management information including the logical addresses of the data in response to the check-out snapshot command and releases the assignment of the first stream ID.

According to an embodiment, a storage device includes: a memory device including a plurality of memory regions; and a controller configured to provide a multistream function of dividing data from a host into a plurality of streams and separately storing the plurality of streams in the plurality of memory regions. The controller assigns different stream identifiers (IDs) to a plurality of virtual machines running on the host and performing snapshot operations overlapping each other in time, and separately stores a plurality of pieces of data from the plurality of virtual machines in the plurality of memory regions based on the stream IDs.

According to an embodiment, a storage device includes: a memory device including a plurality of memory regions; and a controller configured to provide a multistream function of dividing data from a host into a plurality of streams and respectively storing the plurality of streams in the plurality of memory regions. The controller assigns a stream identifier (ID) to a virtual machine running on the host in response to a check-in snapshot command from the virtual machine, stores data of the virtual machine in a memory region corresponding to the stream ID, among the plurality of memory regions, in response to a write command from the virtual machine, stores logical addresses corresponding to the data as snapshot management information in response to a checkout snapshot command from the virtual machine, and, when a write command for a logical address included in the snapshot management information is received from the host, outputs a failure response to the write command to retain data at a point in time at which the checkout snapshot command is provided.

BRIEF DESCRIPTION OF DRAWINGS

The above and other embodiments of the present disclosure will be more clearly understood from the following detailed description, taken in conjunction with the accompanying drawings in which:

FIG. 6 is a tabular diagram illustrating a multistream slot table according to an embodiment of the present disclosure;

DETAILED DESCRIPTION

Hereinafter, embodiments of the present disclosure will be described as non-limiting examples with reference to the accompanying drawings.

Figure 1:
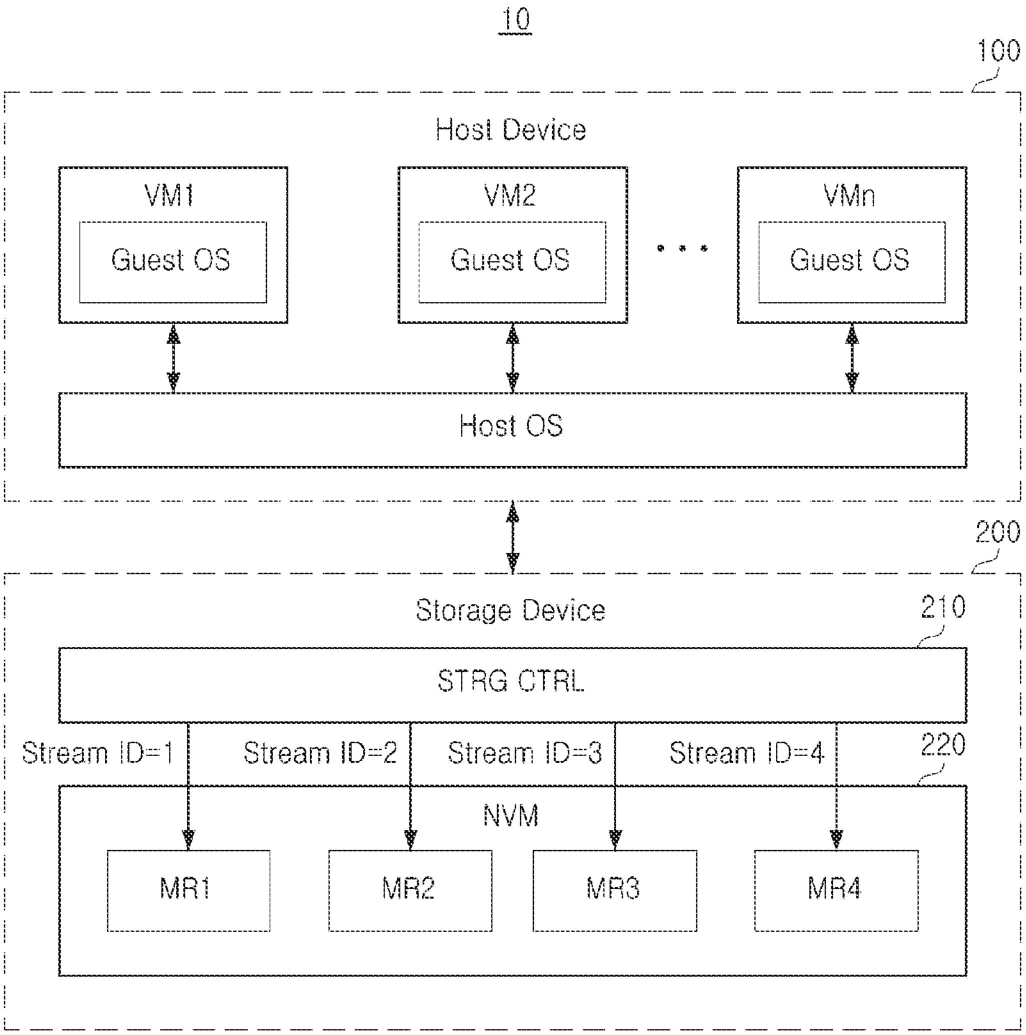
FIG. 1 is a block diagram illustrating a host-storage system according to an embodiment of the present disclosure.
Figure 2:
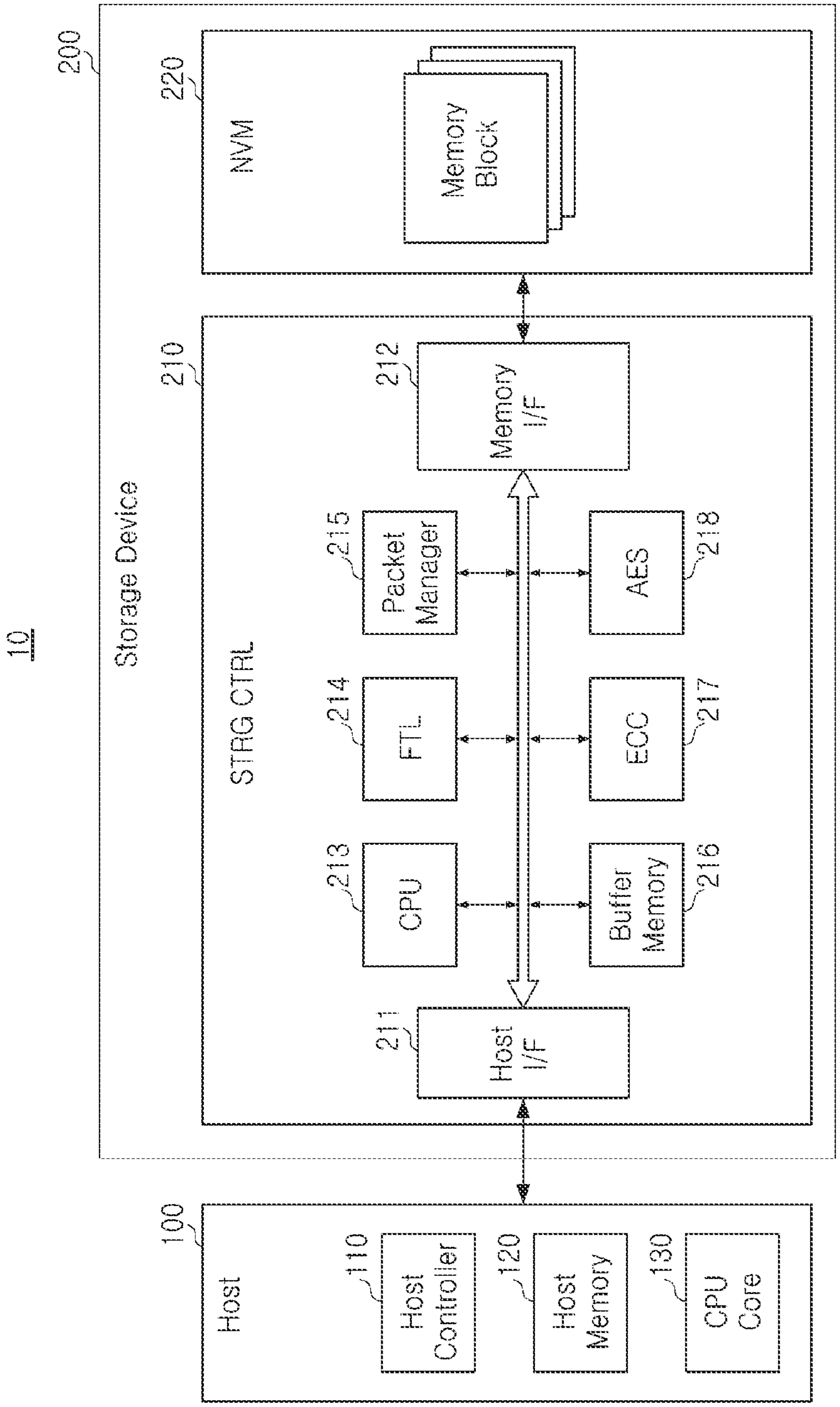
FIG. 2 is a block diagram illustrating a host-storage system according to an embodiment of the present disclosure.

FIGS. 1 and 2 illustrate a host-storage system according to an embodiment.

Referring to FIG. 1, the host-storage system 10 may include a host 100 and a storage device 200. The storage device 200 may include a storage controller 210 and a nonvolatile memory (NVM) 220.

The host-storage system 10 may be a computer server. However, the host-storage system 10 is not limited to a computer server and may be a mobile system, a personal computer, a laptop computer, a media player, vehicle-mounted equipment such as a navigation system, or the like.

The host 100 may support a host operating system (host OS). For example, the host operating system may be a hypervisor. The hypervisor is a software layer constructing a virtualization system, and may provide logically separated hardware to each virtual machine. In addition, the hypervisor may be referred to as a "virtual machine monitor (VMM)" and may refer to firmware or software generating and executing a virtual machine.

A plurality of virtual machines VM1 to VMn) may run on the host operating system. Each of the virtual machines VM1 to VMn may drive a guest operating system (guest OS), and an application may run on the guest operating system.

The guest operating systems of the virtual machines VM1 to VMn may be independent of each other. The host operating system may distribute resources of a hardware layer to the virtual machines VM1 to VMn such that the virtual machines VM1 to VMn may operate independently of each other.

The storage device 200 may include storage media storing data according to a request from the host 100. As an example, the storage device 200 may include at least one of a solid-state drive (SSD), an embedded memory, or a removable external memory. When the storage device 200 includes an SSD, the storage device 200 may be a device conforming to a nonvolatile memory express (NVMe) standard. When the storage device 200 includes an embedded memory or an external memory, the storage device 200 may include a device supporting a universal flash storage (UFS) standard or an embedded multi-media card (eMMC) standard. Each of the host 100 and the storage device 200 may generate and transmit a packet depending on an adopted standard protocol.

The storage device 200 may include a storage controller 210 and a nonvolatile memory 220.

The nonvolatile memory 220 may retain data stored therein even when a power supply thereof is interrupted. The nonvolatile memory 220 may store data, provided from the host 100, through a programming operation and may output data, stored in the nonvolatile memory 220, through a read operation.

When the nonvolatile memory 220 of the storage device 200 includes a flash memory, the flash memory may include a two-dimensional (2D) NAND memory array or a three-dimensional (3D) or vertical NAND (V-NAND) memory array. As another example, the storage device 200 may include other various types of nonvolatile memory. For example, as the storage device 200, a magnetic RAM (MRAM), a spin-transfer torque MRAM (STT-MRAM), a conductive bridging RAM (CBRAM), a ferroelectric RAM (FeRAM), a phase-change RAM (PRAM), a resistive memory (RRAM), and various other types of memory may be applied.

The storage controller 210 may control the nonvolatile memory 220 in response to a request from the host 100. For example, the storage controller 210 may provide data, read from the nonvolatile memory 220, to the host 100, and may store the data, provided from the host 100, in the nonvolatile memory 220. The storage controller 210 may control operations such as a read operation, a programming operation, an erase operation, and the like, of the nonvolatile memory 220.

The storage controller 210 may provide a multistream function of the storage device 200. The multistream function is a function of dividing data into a plurality of streams and separately storing the plurality of streams in a plurality of memory regions, respectively. Referring to FIG. 1, the nonvolatile memory 220 may provide four memory regions MR1 to MR4. The storage controller 210 may assign one stream, among stream ID=1 to stream ID=4 (hereinafter, streams ID1 to ID4), to data stored in the nonvolatile memory 220. In addition, data may be separately stored in the memory regions MR1 to MR4 according to a stream ID of the data.

The host 100 may perform a snapshot operation. The snapshot operation is an operation of retaining data at a specific point in time, such as to return lost data to the data at the specific point in time when some pieces of data are lost due to a user error or a system error. The snapshot operation may be independently performed for each virtual machine VM1 to VMn. The virtual machines VM1 to VMn may periodically perform a snapshot operation during initial installation of an operating system, installation of an application, or an operation of an application to establish a backup environment in which lost data may be reinstated at various points in time.

When the host 100 might perform a snapshot operation to read data at a specific point in time from the storage device to generate snapshot data and/or restore the snapshot data in the storage device 200, performance of the host-storage system 10 might deteriorate. For example, when the virtual machines VM1 to VMn might periodically perform snapshot operations, the amount of data input/output between the host 100 and the storage device 200 for the snapshot operations might increase to deteriorate the performance of the host-storage system 10. In addition, since data of the storage device 200 might be changed while the host 100 reads data from the storage device 200 for the snapshot operation, the host 100 might not obtain data to be retained at a specific point in time and it might be difficult to guarantee accuracy of the snapshot data generated by the host 100.

According to an embodiment, the host 100 may obtain data, stored at a specific point in time, from the storage device 200, to provide a command to the storage device, rather than to generate snapshot data, so that the storage device 200 may protect the data stored therein at a specific point in time. In addition, the host 100 may generate and store a pointer pointing to data stored in the storage device 200 at a specific point in time. According to an embodiment, the amount of data input/output between the host 100 and the storage device 200 for a snapshot operation may be reduced and accuracy of snapshot data at a specific point in time may be guaranteed.

Also, the storage device 200 may respectively assign different snapshot IDs to different virtual machines in response to a request of the virtual machines. The storage device 200 may respectively assign different snapshot IDs to pieces of data of different virtual machines and separately store the pieces of data of the different virtual machines in different memory regions to minimize or prevent write amplification of the nonvolatile memory 220.

Referring to FIG. 2, a host-storage system 10 may include a host 100 and a storage device 200. The storage device 200 may include a storage controller 210 and a nonvolatile memory (NVM) 220. The host 100 and the storage device 200 of FIG. 2 may correspond to those described with reference to FIG. 1.

The host 100 may include a host controller 110, a host memory 120, and a central processing unit (CPU) core 130. The host memory 120 may serve as a buffer memory to temporarily store data to be transmitted to the storage device 200 or data transmitted from the storage device 200.

According to an embodiment, the host controller 110 and the host memory 120 may be implemented as additional semiconductor chips. Alternatively, in some embodiments, the host controller 110 and the host memory 120 may be integrated into the same semiconductor chip. As an example, the host controller 110 may be a single module, among a plurality of modules included in an application processor, and the application processor may be implemented as a system-on-chip (SoC). In addition, the host memory 120 may be an embedded memory provided in the application processor, or a nonvolatile memory or a memory module disposed outside the application processor.

The host controller 110 may manage an operation of storing data (e.g., write data) of a buffer region of the host memory 120 in the nonvolatile memory 220, or an operation of storing data (e.g., read data) of the nonvolatile memory 220 in the buffer region.

The CPU core 130 may control the overall operation of the host 100. For example, the CPU core 130 may run the host operating system and the virtual machines described with reference to FIG. 1, and may further run a device driver controlling the host controller 110.

The storage controller 210 may include a host interface 211, a memory interface 212, a central processing unit (CPU) 213, and a buffer memory 216. The storage controller 210 may further include a working memory into which a flash translation layer (FTL) 214 is loaded, and the CPU 213 may execute the flash translation layer to control data write and read operations to and from the nonvolatile memory 220.

The FTL 214 may perform various functions such as address mapping, wear-leveling, and garbage collection. The address mapping is an operation of changing a logical address, received from a host, into a physical address used to store data in the nonvolatile memory 220. The wear-leveling is a technology for preventing excessive deterioration of a specific block by allowing the blocks included in the nonvolatile memory 220 to be used evenly, and, for example, may be implemented through a firmware technology of balancing erase counts of physical blocks. The garbage collection is a technology for securing usable capacity in the nonvolatile memory 220 by copying valid data of a block to a new block and then erasing an existing block.

The host interface 211 may transmit or receive a packet to or from the host 100. A packet, transmitted from the host 100 to the host interface 211, may include a command or data to be written to the nonvolatile memory 220. A packet, transmitted from the host interface 211 to the host 100, may include a response to a command, data read from the nonvolatile memory 220, or the like. The memory interface 212 may transmit data to be written to the nonvolatile memory 220 to the nonvolatile memory 220, or may receive data read from the nonvolatile memory 220. The memory interface 212 may be implemented to comply with a standard protocol such as a toggle protocol or an Open NAND Flash Interface (ONFI) protocol.

The buffer memory 216 may buffer various pieces of data used for an operation of the storage device 200. For example, the buffer memory 216 may include mapping data referenced to perform translation between a logical address provided from the host 100 and a physical address on the nonvolatile memory 220, error correction code (ECC) data referenced to detect and correct an error of data output from the nonvolatile memory 220, status data associated with a status of each of the nonvolatile memory devices 220, and the like. The buffer memory 216 may include a volatile memory, such as SRAM, DRAM, SDRAM, or the like, and/or a nonvolatile memory such as PRAM, MRAM, ReRAM, FRAM, or the like.

The nonvolatile memory 220 may include one or more memory devices including a plurality of memory blocks. Each of the memory blocks may include a plurality of pages, and each of the pages may include a plurality of memory cells connected to a wordline.

Figure 3:
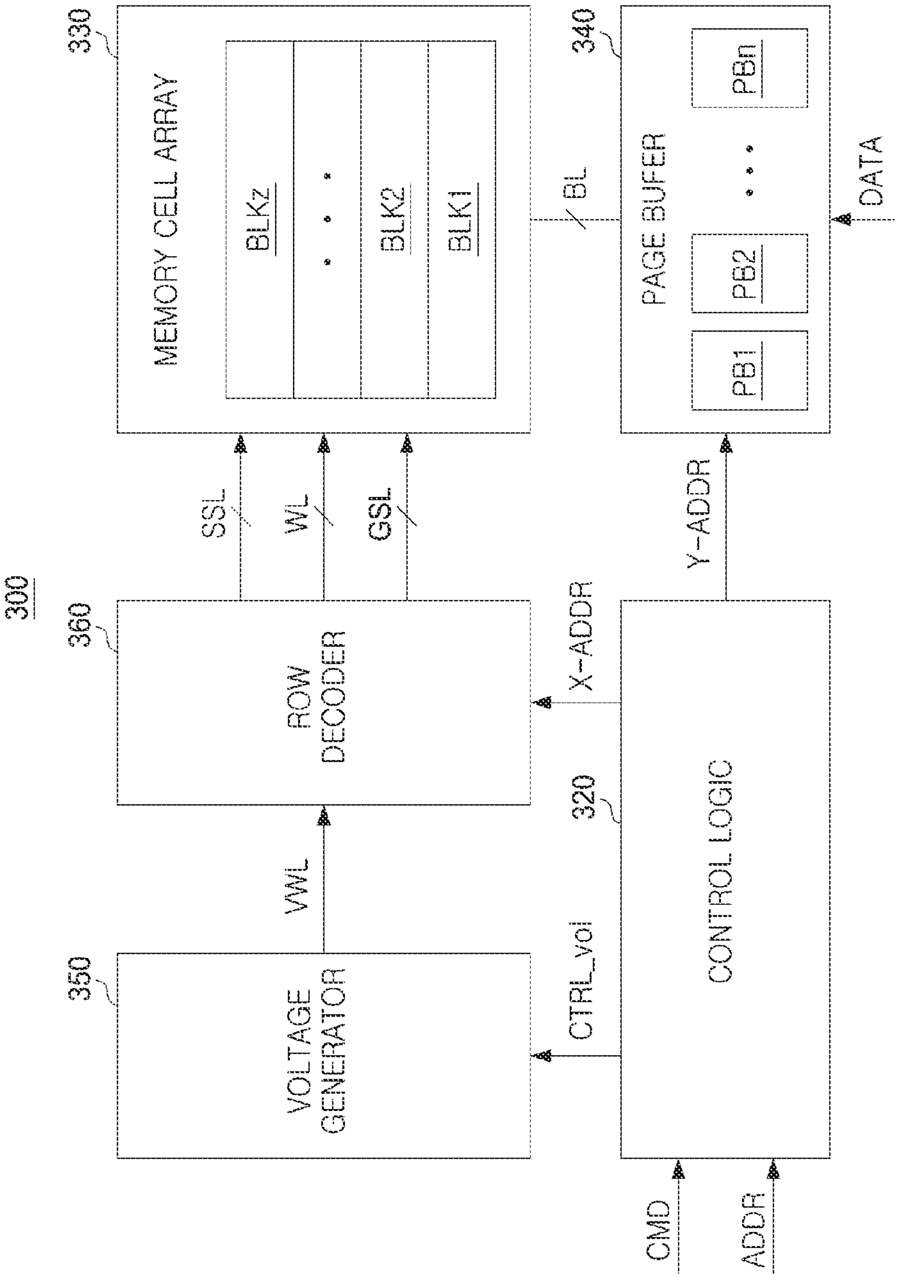
FIG. 3 is a block diagram illustrating an example of a memory device embodiment of the present disclosure.

FIG. 3 illustrates an example of a memory device.

Referring to FIG. 3, a memory device 300 may include a control logic circuit 320, a memory cell array 330, a page buffer 340, a voltage generator 350, and a row decoder 360. The memory device 300 may further include a memory interface circuit, column logic, a predecoder, a temperature sensor, a command decoder, an address decoder, and the like. The memory device 300 of FIG. 3 may correspond to the nonvolatile memory 220 described with reference to FIGS. 1 and 2.

The control logic circuit 320 may control various overall operations of the memory device 300. The control logic circuit 320 may output various control signals in response to a command CMD and/or an address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (where z is a positive integer), and each of the plurality of memory blocks BLK1 through BLKz may include a plurality of memory cells. The memory cell array 330 may be connected to a page buffer 340 through bitlines BL, and may be connected to the row decoder 360 through wordlines WL, string select lines SSL, and ground select lines GSL.

In an embodiment, the memory cell array 330 may include a 3D memory cell array, and the 3D memory cell array may include a plurality of NAND strings. Each of the NAND strings may include memory cells, respectively connected to wordlines vertically stacked on a substrate.

The page buffer 340 may include a plurality of page buffers PB1 to PBn (where n is an integer greater than or equal to 3), and the plurality of page buffers PB1 to PBn may be connected to the memory cells through a plurality of bitlines BL, respectively. The page buffer 340 may select at least one of the bitlines BL in response to the column address Y-ADDR. The page buffer 340 may operate as a write driver or a sense amplifier according to an operation mode. For example, the page buffer 340 may apply a bitline voltage, corresponding to data to be programmed, to a selected bitline during a program operation. The page buffer 340 may sense a current or a voltage of the selected bitline to sense data stored in the memory cell.

The voltage generator 350 may generate various voltages to perform program, read, and erase operations based on the voltage control signal CTRL_vol. For example, the voltage generator 350 may generate a program voltage, a read voltage, a program verify voltage, an erase voltage, and the like, as wordline voltages VWL.

The row decoder 360 may select one of the plurality of wordlines WL in response to the row address X-ADDR and may select one of the plurality of string selection lines SSL. For example, the row decoder 360 may apply a program voltage and a program-verify voltage to a selected wordline during a program operation, and may apply a read voltage to the selected wordline during a read operation.

Figure 4:
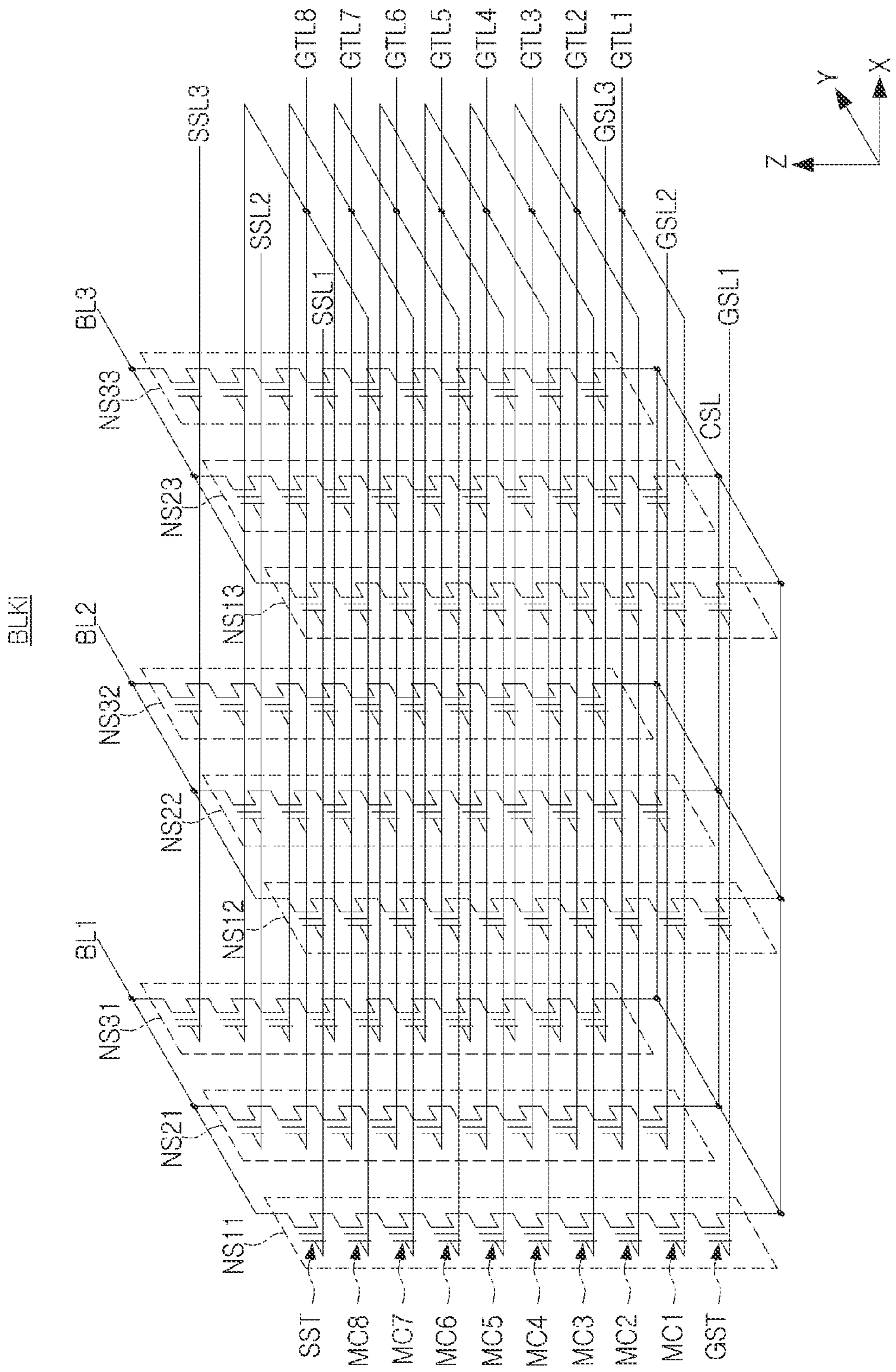
FIG. 4 is a circuit diagram illustrating a three-dimensional (3D) V-NAND structure, applicable to a memory device according to an embodiment of the present disclosure.

FIG. 4 illustrates a three-dimensional (3D) V-NAND structure, applicable to a memory device according to an embodiment.

When a storage module of the memory device is implemented as a 3D V-NAND flash memory, each of a plurality of memory blocks constituting the storage module may be represented by an equivalent circuit, as illustrated in FIG. 4.

A memory block BLKi illustrated in FIG. 4 represents a three-dimensional memory block formed on a substrate to have a three-dimensional structure. For example, a plurality of memory NAND strings included in the memory block BLKi may be formed in a direction perpendicular to the substrate.

Referring to FIG. 4, the memory block BLKi may include a plurality of memory NAND strings NS11 to NS33 connected between bitlines BL1, BL2, and BL3 and a common source line CSL. Each of the plurality of memory NAND strings NS11 to NS33 may include a string select transistor SST, a plurality of memory cells MC1, MC2 through MC8, and a ground select transistor GST. In FIG. 4, each of the plurality of memory NAND strings NS11 to NS33 are illustrated as including eight memory cells MC1, MC2 through MC8, but embodiments are not limited thereto.

The string select transistor SST may be connected to corresponding string select lines SSL1, SSL2, and SSL3. The plurality of memory cells MC1, MC2, through MC8 may be connected to corresponding gate lines GTL1, GTL2 through GTL8, respectively. The gate lines GTL1, GTL2 through GTL8 may correspond to wordlines (e.g., GTL1 may correspond to WL1), and some of the gate lines GTL1, GTL2 through GTL8 may correspond to dummy wordlines. The ground select transistor GST may be connected to corresponding ground select lines GSL1, GSL2, and GSL3. The string select transistor SST may be connected to corresponding bitlines BL1, BL2, and BL3, and the ground select transistor GST may be connected to a common source line CSL.

Wordlines (e.g., WL1 corresponding with GTL1) on the same height level may be commonly connected to each other, and the ground select lines GSL1, GSL2, and GSL3 and the string select lines SSL1, SSL2, and SSL3 may be separated from one another. In FIG. 4, the memory block BLKi is illustrated as being connected to the eight gate lines GTL1, GTL2 through GTL8 and the three bit lines BL1, BL2, and BL3, but embodiments are not limited thereto.

Memory cells of the memory block BLKi may be connected to wordlines. A group of memory cells, connected to a single wordline, may be referred to as a page. The memory cells may be programmed or read in units of pages by the row decoder 360 described with reference to FIG. 4. On the other hand, the memory cells may be erased in units of memory blocks BLKi.

The nonvolatile memory 220 need not support an overwrite operation, and units of the program operation and the erase operation may be different from each other. To update existing data stored in a page in the nonvolatile memory 220, the existing data may be invalidated and data to be updated may be programmed in another page. Since memory space of the nonvolatile memory 220 might otherwise be wasted when invalid data remains in the memory block, the storage controller 210 may periodically remove the invalid data of the nonvolatile memory through a garbage collection operation, so the memory space may be freed.

When a garbage collection operation is performed too frequently, the amount of data programmed in the nonvolatile memory 220 might be increased as compared with the amount of actual data written to the storage device 200 by the host 100. This is referred to write amplification (WA). When a plurality of pieces of data having different properties may be separately stored in different memory blocks, garbage collection operations of the nonvolatile memory 220 may be mitigated and write amplification of the nonvolatile memory 220 may be reduced. The storage device 200 may provide a multistream function of dividing data from the host 100 into a plurality of streams for separately storing the plurality of streams in different memory blocks to reduce write amplification in the nonvolatile memory 220.

According to an embodiment, the storage controller 210 may use a multistream function to support snapshot operations of each of a plurality of virtual machines. Since pieces of data of different virtual machines may be separately stored in different memory regions, a snapshot operation of a plurality of virtual machines may be effectively supported while reducing the write amplification of the nonvolatile memory 220. Hereinafter, a snapshot operation of the host-storage system 10 according to an embodiment will be described in detail with reference to FIGS. 5 to 13B.

Figure 5:
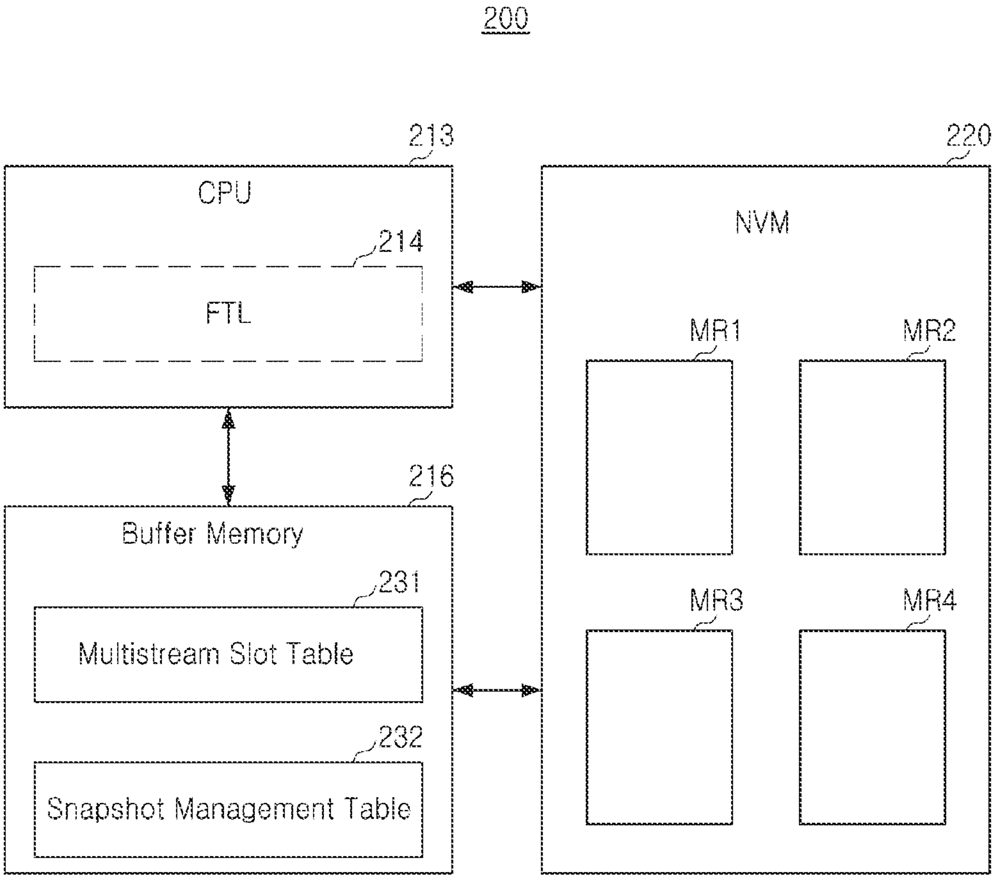
FIG. 5 is a block diagram illustrating a storage device according to an embodiment of the present disclosure.

FIG. 5 illustrates a storage device according to an embodiment.

Referring to FIG. 5, a storage device 200 may include a CPU 213, a buffer memory 216, and a nonvolatile memory 220. The CPU 213, the buffer memory 216, and the nonvolatile memory 220 illustrated in FIG. 5 may correspond to those described with reference to FIG. 2, without limitation thereto.

The CPU 213 may drive the FTL 214. The FTL 214 may perform address mapping between a logical address, used in a file system of the host 100, and a physical address of the nonvolatile memory 220. In some embodiments, this physical address may be a virtual physical address that is variably mapped to an actual physical address.

The FTL 214 may provide a multistream function. For example, the FTL 214 may assign a stream ID to data received from the host 100, and may perform address mapping to separately store a plurality of pieces of data having different stream IDs in different memory regions of the nonvolatile memory 220.

The nonvolatile memory 220 may include a plurality of memory regions MR1 to MR4. According to an embodiment, each of the memory regions MR1 to MR4 may correspond to a different memory block. In addition, the memory regions MR1 to MR4 may correspond to different stream IDs, respectively. In the example of FIG. 5, the FTL 214 may support four stream IDs, and the four stream IDs may correspond to at least four memory regions MR1 to MR4, respectively.

The FTL 214 may support a snapshot operation for a plurality of virtual machines. According to an embodiment, virtual machines may each perform a snapshot operation using a check-in snapshot command, a write command, and a check-out snapshot command. The check-in snapshot command and the check-out snapshot command may be administrative or "admin" commands previously agreed between the host 100 and the storage device 200.

For example, when the virtual machine provides a check-in snapshot command to the storage device 200 to start a snapshot operation, the FTL 214 may assign a snapshot ID to the virtual machine in response to the check-in snapshot command.

When the virtual machine provides a write command to the storage device 200 to log host data generated or updated in the virtual machine, the FTL 214 may perform address mapping to store the host data in a memory region corresponding to the snapshot ID.

When the virtual machine provides a check-out snapshot command to the storage device 200 to preserve data at a specific point in time, the FTL 214 may protect a logical region, corresponding to host data stored in the memory region, such that the host data up to the specific point in time is not changed or erased in response to the check-out snapshot command. For example, when a write command for the protected logical region is received from the host 100, the FTL 214 may output a failure response through the host interface 211 without executing the write command.

The buffer memory 216 may store a multistream slot table 231 and a snapshot management table 232. The multistream slot table 231 may indicate whether each of the stream IDs supported by the FTL 214 has been assigned to a virtual machine. In addition, the snapshot management table 232 may indicate which virtual machine snapshot corresponds to which stream ID, and may further include information of a logical region to be protected by the snapshot.

The FTL 214 may support snapshot operations of virtual machines based on the multistream slot table 231 and the snapshot management table 232 stored in the buffer memory 216. For example, the FTL 214 may assign a stream ID, which does not overlap another virtual machine, to a virtual machine based on the multistream slot table 231. In addition, the FTL 214 may protect the logical regions based on the snapshot management table 232.

A method, in which the FTL 214 supports snapshot operations of virtual machines based on the multistream slot table 231 and the snapshot management table 232, will be described in greater detail with reference to FIGS. 6 to 8.

FIG. 6 illustrates a multistream slot table 231.

The multistream slot table 231 may include information indicating whether a virtual machine is assigned to each of the stream IDs supported by the FTL 214. In the example of FIG. 5, the first virtual machine VM1 may be assigned to the stream ID1, among the four stream IDs, the second virtual machine VM2 may be assigned to the stream ID2, and no virtual machine need be assigned to the stream ID3 and the stream ID4.

When assigning a stream ID to a virtual machine, the FTL 214 may assign a stream ID, which is not assigned to another virtual machine, based on the multistream slot table 231. For example, when a check-in snapshot command is received from the third virtual machine VM3, the stream ID3 or ID4 may be assigned to the third virtual machine VM3 based on the multistream slot table 231.

According to an embodiment, the FTL 214 may assign a stream ID in response to a check-in snapshot command from a virtual machine and may release the assigned stream ID in response to the check-out snapshot command from the virtual machine. For example, the stream ID may be temporarily assigned to the virtual machine while the virtual machine performs a snapshot operation.

Figure 7:
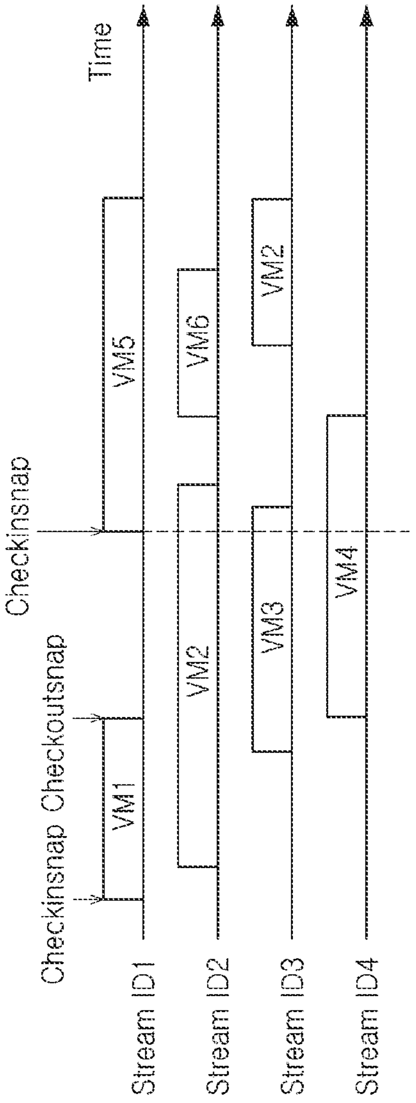
FIG. 7 is a hybrid diagram illustrating multistream slot and snapshot management according to an embodiment of the present disclosure.

FIG. 7 illustrates virtual machines which may be assigned to stream IDs with the passage of time.

FIG. 7 illustrates a case in which the four streams ID1 to ID4 are assigned to or released from six virtual machines VM1 to VM6 with the passage of time, without limitation thereto. For example, the first virtual machine VM1 may be assigned to the stream ID1 in response to a check-in snapshot command CheckInSnap from the first virtual machine VM1, and stream ID1 may be released in response to a check-out snapshot command CheckOutSnap from the first virtual machine VM1. In the example of FIG. 7, after the stream ID1 is assigned to the first virtual machine VM1, the second to fourth virtual machines VM2 to VM4 might be sequentially assigned to the streams ID2, ID3, and ID4, and a check-in snapshot command might be received from the fifth virtual machine VM5.

The FTL 214 may search for a stream ID unassigned to another virtual machine at the time of receiving the check-in snapshot command from the fifth virtual machine VM5 based on the multistream slot table 231. In the example of FIG. 7, the stream ID1 might not be currently assigned to another virtual machine, so the FTL 214 may assign the stream ID1 to the fifth virtual machine VM5. For example, the stream ID1 may be temporarily assigned to the first virtual machine VM1, and after release from the first virtual machine VM1, may then be reassigned to the fifth virtual machine VM5.

Similarly, after receiving the check-in snapshot command from the sixth virtual machine VM6, the FTL 214 may assign a stream ID2, unassigned to another virtual machine, to the sixth virtual machine VM6.

According to an embodiment, the storage device 200 may temporarily assign a stream ID while the virtual machine performs a snapshot operation. According to an embodiment, snapshot operations may be supported for a greater number of virtual machines than the number of stream IDs supported by the storage device 200.

Figure 8:
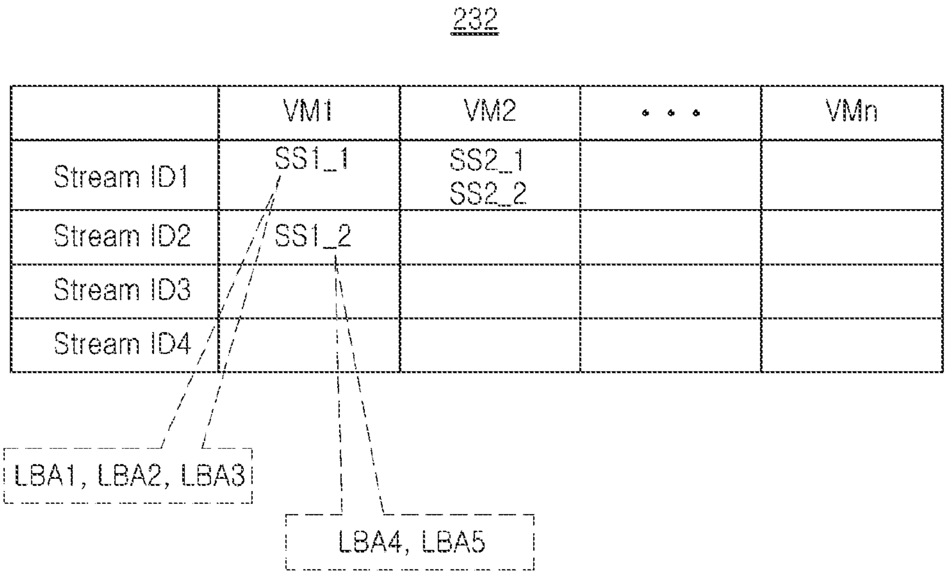
FIG. 8 is a tabular diagram illustrating a snapshot management table according to an embodiment of the present disclosure.

FIG. 8 illustrates a snapshot management table 232.

The snapshot management table 232 may include an entry corresponding to virtual machines VM1 to VMn and stream IDs, where a history of snapshots requested from the virtual machines VM1 to VMn may be stored in the entry of the snapshot management table 232, and information about logical regions protected for each snapshot may be further stored in the entry of the snapshot management table 232.

The virtual machines VM1 to VMn may periodically perform snapshot operations to return the system to various points in time. Snapshots generated by the snapshot operations may be classified into snapshot IDs, respectively. The virtual machines VM1 to VMn may provide snapshot IDs together when providing a check-in snapshot command and a check-out snapshot command. In the example of FIG. 8, the snapshot IDs may be stored in the entry of the snapshot management table 232.

For example, when stream ID1 is assigned to the first virtual machine VM1 to support a snapshot operation corresponding to a snapshot ID SS1_1 received from the first virtual machine VM1, the snapshot ID SS1_1 may be stored in the entry corresponding to the first virtual machine VM1 and the stream ID1 of the snapshot management table 232.

When the snapshot operation corresponding to the snapshot ID SS1_1 is finished, information on the logical region corresponding to the snapshot ID SS1_1 may be stored in the snapshot management table 232. In the example of FIG. 8, the snapshot management table 232 may further store logical addresses LBA1, LBA2, and LBA3 in relation to the snapshot ID SS1_1.

When the stream ID2 is assigned to the first virtual machine VM1 to support the snapshot operation corresponding to a snapshot ID SS1_2 received from the first virtual machine VM1, the snapshot ID SS1_2 and logical addresses LBA4 and LBA5 corresponding to the snapshot ID SS1_2 may be further stored in the entry corresponding to the first virtual machine VM1 and stream ID2 of the snapshot management table 232.

Similarly, the snapshot management table 232 may write a history for snapshot IDs SS2_1 and SS2_2 of the second virtual machine VM2. The snapshot management table 232 may further include logical addresses of data stored in the storage device during the snapshot operation corresponding to the snapshot IDs SS2_1 and ID SS2_2.

A logical region, corresponding to logical addresses stored in the snapshot management table 232, may be protected. For example, when a logical address received along with a write command from the host 100 is a logical address included in the snapshot management table 232, the FTL 214 may provide a failure response to the write command to protect data corresponding to the logical address.

Hereinafter, an operation of the host-storage system 10 according to an embodiment will be described in detail with reference to FIGS. 9 to 13B.

Figure 9:
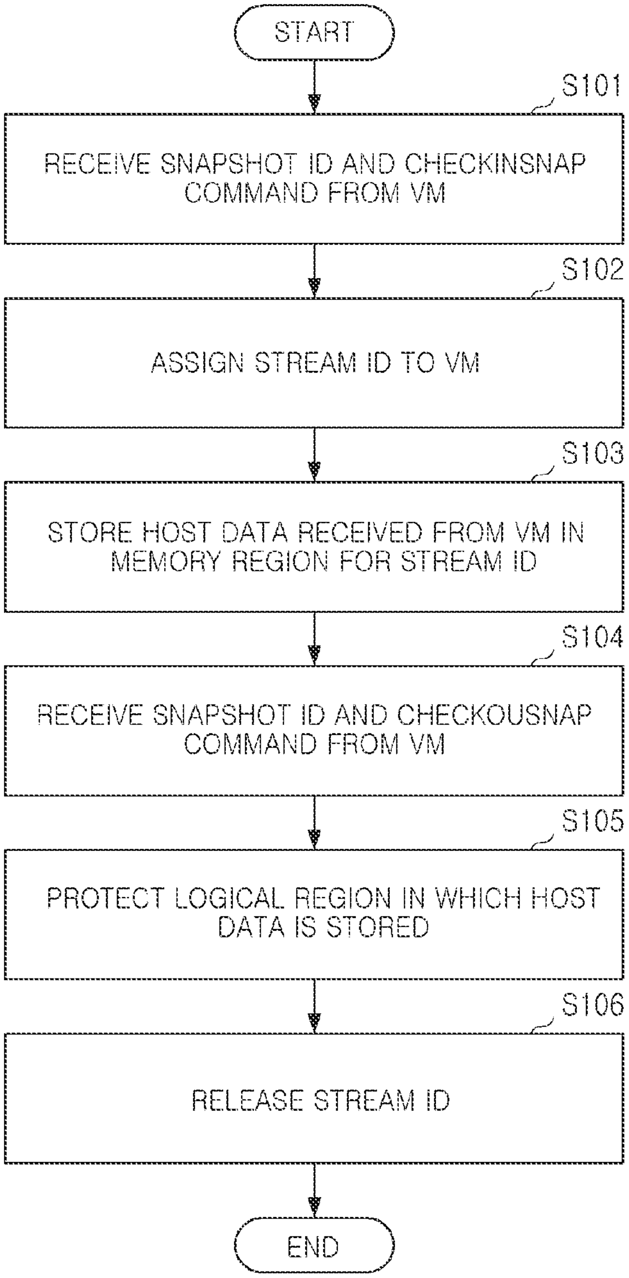
FIG. 9 is a flowchart diagram illustrating an operation of a storage device according to an embodiment of the present disclosure.

FIG. 9 illustrates an operation of a storage device according to an embodiment.

In operation S101, a storage device 200 may receive a snapshot ID and a check-in snapshot command from a virtual machine.

For example, to start a snapshot operation, the virtual machine may assign the snapshot ID before writing data to the storage device 200 and provide a check-in snapshot command for the snapshot ID to the storage device 200.

In operation S102, the storage device 200 may assign a stream ID to the virtual machine.

As described with reference to FIGS. 6 to 7, the storage device 200 may assign a stream ID, currently unassigned to another virtual machine, to the virtual machine based on the multistream slot table 231.

In operation S103, the storage device 200 may store host data, received from the virtual machine, in a memory region assigned for the stream ID.

For example, the storage device 200 may store data, received from the virtual machine, during a snapshot operation in a single memory region to prevent the stored data from being mixed with data from another virtual machine.

In operation S104, the storage device 200 may receive a snapshot ID and a check-out snapshot command from the virtual machine to generate a snapshot at a specific point in time.

In operation S105, the storage device 200 may protect a logical region, in which data is stored up to the specific point in time, in response to the check-out snapshot command.

As described with reference to FIG. 8, the storage device 200 may update logical addresses, corresponding to an identifier of the virtual machine and the stream ID, to an entry corresponding to the snapshot ID and the host data in the snapshot management able 232 and may protect the logical addresses stored in the snapshot management table 232.

Figure 10:
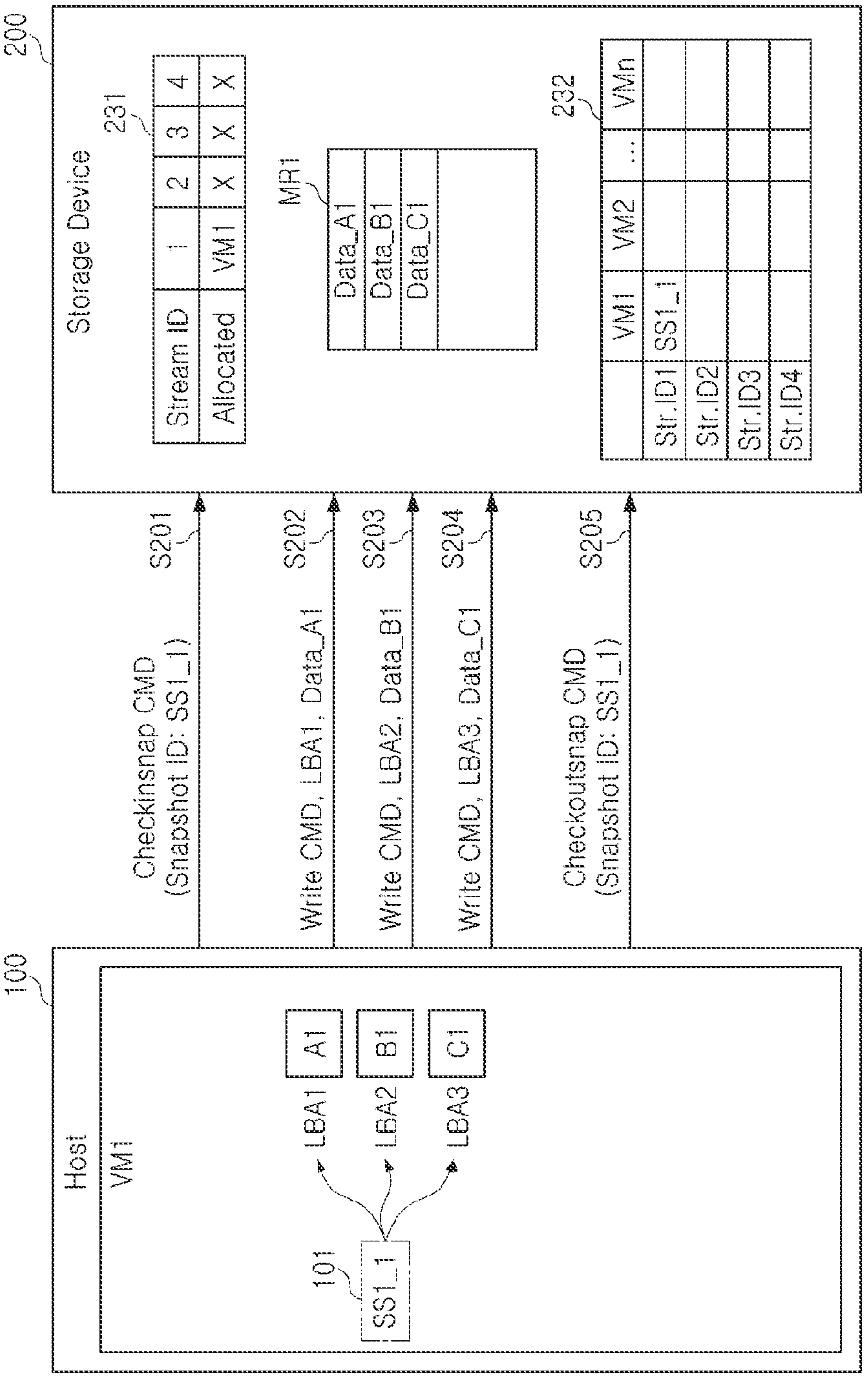
FIG. 10 is a hybrid diagram illustrating an operation of a host-storage system according to an embodiment of the present disclosure.

Hereinafter, an operation of a host-storage system according to an embodiment will be described in detail with reference to FIGS. 10 to 11B. In FIGS. 10 to 11B, a description will be provided regarding an example of an operation of a first virtual machine VM1 running in a host 100 and an operation of a storage device 200 supporting a snapshot operation of the first virtual machine VM1.

Referring to FIG. 10, in operation S201, before host data is stored in the storage device 200, the first virtual machine VM1 may provide a snapshot ID to start a snapshot operation and provide a check-in snapshot command for the snapshot ID. In the example of FIG. 10, a snapshot ID SS1_1 may be provided.

The storage device 200 may assign a stream ID to the first virtual machine VM1 in response to the check-in snapshot command. The storage device 200 may assign a stream ID1, unassigned to another virtual machine, to the first virtual machine VM1 based on the multistream slot table 231 and may update the multistream slot table 231.

The first virtual machine VM1 may generate data A1, data B1, and data C1. For example, the data A1, the data B1, and the data C1 may constitute a file or files included in a file system managed by a guest operating system of the first virtual machine VM1. The file system may provide a logical address, for example, a logical block address LBA to the data. Logical addresses LBA1, LBA2, and LBA3 may be assigned to the data A1, the data B1, and the data C1, respectively.

In operations S202 to S204, the first virtual machine VM1 may provide the logical addresses LBA1, LBA2, LBA3 and host data Data_A1, host data Data_B1, and host data Data_C1, together with write commands, to the storage device 200.

The storage device 200 may store the host data Data_A1, host data Data_B1, and host data Data_C1 in a first memory region MR1 corresponding to the stream ID1.

The first virtual machine VM1 may generate a snapshot, corresponding to the snapshot ID SS1_1, to preserve a state in which the data A1, the data B1, and the data C1 are included in a file at a specific point in time. To generate a snapshot, the first virtual machine VM1 may generate snapshot information 101 including pointers pointing to the logical addresses LBA1, LBA2, and LBA3 of the data A1, the data B1, and the data C1. The first virtual machine VM1 may provide the snapshot ID SS1_1 and the check-out snapshot command to the storage device 200 to protect the logical region corresponding to the logical addresses LBA1, LBA2, and LBA3 in operation S205.

The storage device 200 may store the snapshot ID SS1_1 in an entry corresponding to the first virtual machine VM1 and the stream ID1 of the snapshot management table 232. The storage device 200 may further store the logical addresses LBA1, LBA2, and LBA3, together with the snapshot ID SS1_1, in the snapshot management table 232.

The first virtual machine VM1 may update the file including the data A1, the data B1, and the data C1 after the snapshot operation corresponding to the snapshot ID SS1_1 is finished. For example, the data A1, the data B1, and the data C1 may be changed or other data may be added.

Even when the first virtual machine VM1 updates the data A1, the data B1, and the data C1, the data A1, the data B1, and the data C1 may be retained in the logical region corresponding to the addresses LBA1, LBA2 to return to a snapshot point in time corresponding to the snapshot ID SS1_1. The first virtual machine VM1 may write updated data in another logical region. The first virtual machine VM1 may perform an additional snapshot operation to preserve a state at the point in time after the data is updated.

There are various methods in which the first virtual machine VM1 writes updated data while retaining data at a point in time of a snapshot. Hereinafter, a method, in which the storage device 200 supports an additional snapshot operation of the virtual machine VM1 when the first virtual machine VM1 writes updated data using various methods, will be described with reference to FIGS. 11A and 11B.

Figure 11A:
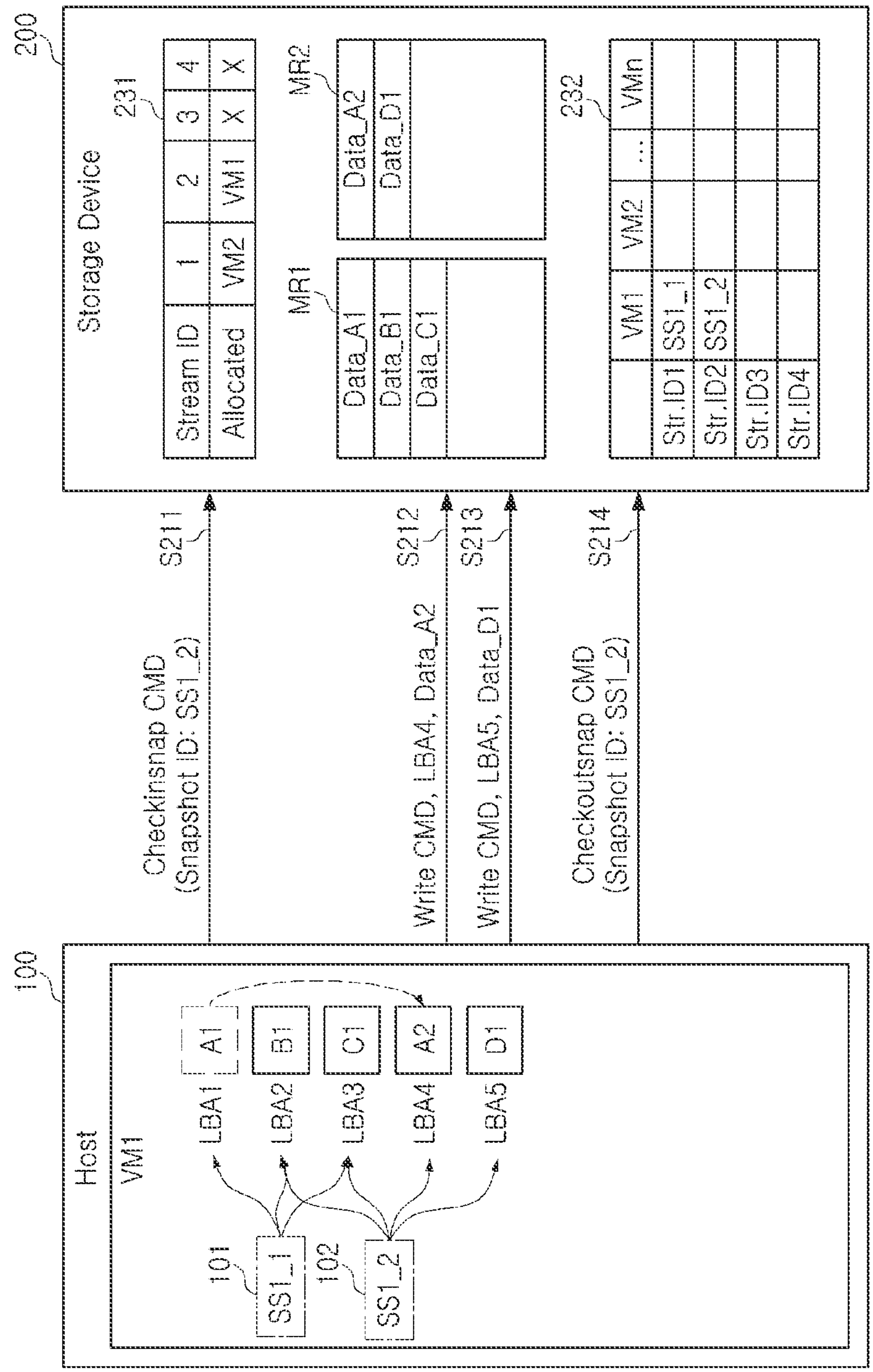
FIG. 11A is a hybrid diagram illustrating an operation of a host-storage system according to an embodiment of the present disclosure.
Figure 11B:
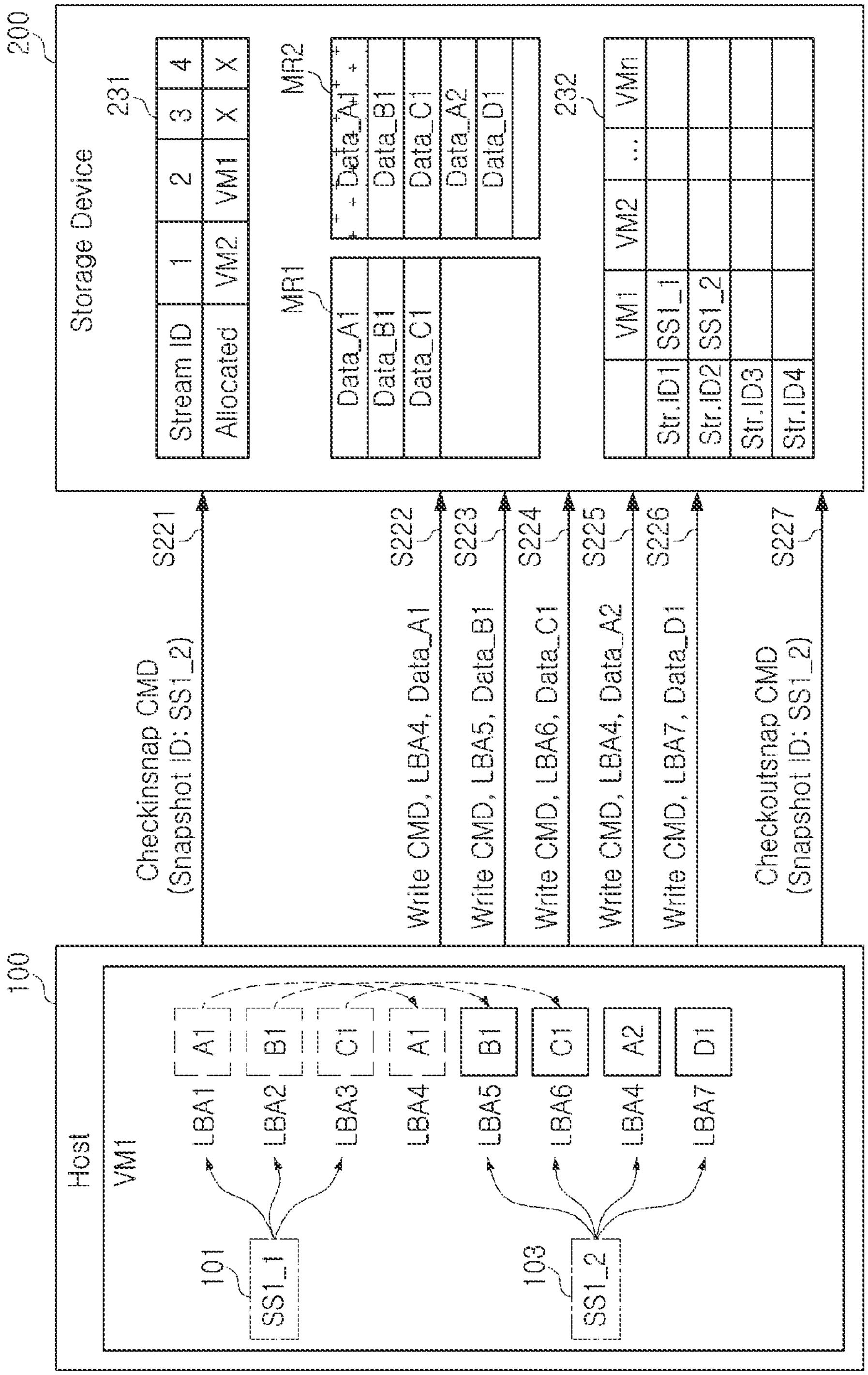
FIG. 11B is a hybrid diagram illustrating an operation of a host-storage system according to an embodiment of the present disclosure.

FIG. 11A illustrates a method in which the storage device 200 supports an additional snapshot operation in the case in which the first virtual machine VM1 updates data in the state described with reference to FIG. 10 and writes the updated data using an incremental snapshot method, as an example.

When the first virtual machine VM1 uses the incremental snapshot method, updated data may be written by assigning a new logical address while retaining existing data.

In a file including data A1, data B1, and data C1, the data A1 may be updated with data A2, and data D1 may be added. For example, at a current point in time, the first virtual machine VM1 may include data A2, data B1, data C1, and data D1 as valid data.

The first virtual machine VM1 may write the updated data A2 and D1 to a new logical region while retaining an existing file including the data A1, data B1, and data C1 in an existing logical region. For example, new logical addresses LBA4 and LBA5 may be assigned to write the updated data A2 and the data D1.

In operation S211, the first virtual machine VM1 may provide a snapshot ID and a check-in snapshot command to the storage device 200 before storing updated data in the storage device 200. In the example of FIG. 11A, the snapshot ID may be SS1_2, an ID distinguished from the previously provided SS1_1.

The storage device 200 may assign a stream ID to the first virtual machine VM1 in response to the check-in snapshot command. In the example of FIG. 10A, according to the multistream snapshot table 231, when the check-in snapshot command corresponding to the snapshot ID SS1_2 is provided, the stream ID1 may be in a state of being assigned to the second virtual machine VM2. The storage device 200 may assign a stream ID2, unassigned to another virtual machine, to the first virtual machine VM1.

In operations S212 and S213, the first virtual machine VM1 may provide data A2 and data D1 and logical addresses LBA4 and LBA5, together with write commands, to the storage device 200.

The storage device 200 may program the data A2 and D1 to the second memory region MR2 corresponding to a stream ID2 in response to write commands. Meanwhile, the data A1, the data B1, and the data C1 may remain stored in the first memory region MR1.

The first virtual machine VM1 may generate a snapshot, corresponding to the snapshot ID SS1_2, to preserve a state including the data A2, the data B1, the data C1, and the data D1. For example, the first virtual machine VM1 may generate snapshot information 102 including pointers pointing to logical addresses LBA2, LBA3, LBA4, LBA5 of the data A2, the data B1, the data C1, and the data D1. In addition, the first virtual machine VM1 may provide the snapshot ID SS1_2 and the check-out snapshot command such that the storage device 200 protects data in operation S214.

The storage device 200 may store the snapshot ID SS1_2 in an entry corresponding to the first virtual machine VM1 and the stream ID2 of the snapshot management table 232. The storage device 200 may further store logical addresses LBA4 and LBA5 corresponding to the data stored during a snapshot operation, together with the snapshot ID SS1_2, in the snapshot management table 232. The storage device 200 may protect the logical region corresponding to the logical addresses LBA4 and LBA5 so as not to change or erase data corresponding to the logical addresses LBA4 and LBA5.

In the example of FIG. 11A, the first virtual machine VM1 may return a file state to a snapshot time point using snapshot information 101 and snapshot information 102. Data corresponding to the logical addresses LBA1 to LBA5 may be protected by the storage device 200. Accordingly, when the first virtual machine VM1 accesses the storage device 200 using the logical addresses LBA1, LBA2, and LBA3 indicated by the first snapshot information 101, the first virtual machine VM1 may recover the data A1, the data B1, and the data C1. In addition, when the first virtual machine VM1 accesses the storage device 200 using the logical addresses LBA2, LBA3, LBA4, and LBA5 indicated by the second snapshot information 102, the first virtual machine VM1 may recover the data A2, the data B1, the data C1, and the data D1.

FIG. 11B illustrates a method in which the storage device 200 supports an additional snapshot operation in the case in which the first virtual machine VM1 updates data in the state described with reference to FIG. 10 and writes the updated data using a full snapshot method, which differs from the incremental snapshot method of FIG. 11A, as an example.

When the first virtual machine VM1 uses the full snapshot method, the first virtual machine VM1 may copy and store existing data in a new logical region and may update the data stored in the new logical region. The first virtual machine VM1 may copy and write data A1, data B1, and data C1 of an existing file to logical addresses LBA4, LBA5, and LBA6. The data A1, the data B1, and the data C1 may be written to the logical addresses LBA4, LBA5, LBA6. In addition, when the data A1 is changed into the data A2, the first virtual machine VM1 may overwrite the data A2 to the logical address LBA4. In addition, when the data D1 is added, the first virtual machine VM1 may write the data D1 to a new logical address LBA7.

In operation S221, the first virtual machine VM1 may provide a snapshot ID and a check-in snapshot command to the storage device 200 before storing the updated data in the storage device 200. The storage device 200 may assign a stream ID to the first virtual machine VM1 in response to the check-in snapshot command. Similar to the operation S211 described with reference to FIG. 11A, by the operation S221 the storage device 200 may assign a stream ID2 to the first virtual machine VM1.

The first virtual machine VM1 may provide the logical addresses LBA4, LBA5, and LBA6 and the host data A1, the host data B1, and host data C1, together with write commands, to the storage device 200 in operations S222 to S224 to copy and provide the data A1, the data B1, and the data C1 of the existing file to the logical addresses LBA4, LBA5, and LBA6. Then, the first virtual machine VM1 may provide logical addresses LBA4 and LBA7 and the host data A2 and the host data D1, together with the write commands, to the storage device 200 in operations S225 and S226 to update data.

The data A1, the data B1, the data C1, the data A2, and the data D1 may be sequentially programmed to the second memory region MR2 corresponding to the stream ID2. In the second memory region MR2, the data A1 corresponding to the logical address LBA4 may be invalidated when the updated data A2 is programmed in the second memory region MR2.

The first virtual machine VM1 may generate a snapshot corresponding to the snapshot ID SS1_2 to preserve a state in which the data A2, the data B1, the data C1, and the data D1 are included in the file. For example, the first virtual machine VM1 may generate snapshot information 103 including pointers pointing to logical addresses LBA4, LBA5, LBA6, and LBA7 of data A2, the data B1, the data C1, and the data D1. In addition, the first virtual machine VM1 may provide the snapshot ID SS1_2 and the check-out snapshot command such that the storage device 200 protects the logical region corresponding to the logical addresses LBA4, LBA5, LBA6, and LBA7 in operation S227.

The storage device may store the snapshot ID SS1_2 in the entry corresponding to the first virtual machine VM1 and the stream ID2 of the snapshot management table 232, and may further store the logical addresses LBA4, LBA5, LBA6, and LBA7.

Similar to the operations S212-S213 described in FIG. 11A, by the operations S222-S226 the storage device 200 may protect a logical region corresponding to a logical address included in the snapshot management table 232. In addition, the first virtual machine VM1 may access the protected data using the snapshot information 101 and the snapshot information 103 to return a file state to each snapshot point in time, respectively.

According to an embodiment, a virtual machine may provide a check-out snapshot command by operation S227 to control the storage device 200 to protect a logical region corresponding to data stored in the virtual machine at a point in time at which the check-out snapshot command is provided.

The virtual machine need not load host data stored in the storage device 200, but perform a snapshot operation on data at a point in time at which the check-out snapshot command is provided. Accordingly, the amount of data input/output of the host 100 and the storage device 200 for performing the snapshot operation may be decreased, and accurate data at the point in time, at which when the snapshot command is provided, may be retained.

In alternate embodiments, it shall be understood that each snapshot or memory region thereof may be accessed by the first virtual machine that created it, regardless of whether that first virtual machine has since changed stream ID, since the snapshot management table maintains a record of the creating virtual machine. Moreover, commands to overwrite the snapshot or memory region by a different virtual machine, even if it has been assigned the same stream ID as previously used by the first virtual machine, may be effectively blocked. In an alternate embodiment, each snapshot stored in a memory region may be accessible by virtual machine ID rather than snapshot ID, even if the storing virtual machine is using a different stream ID.

An interaction between a plurality of virtual machines and a storage device according to an embodiment will be described with reference to FIGS. 12 to 13B. For example, FIGS. 12 to 13B illustrate an embodiment with an interaction between the first and second virtual machines VM1 and VM2 and the storage device 200.

Figure 12:
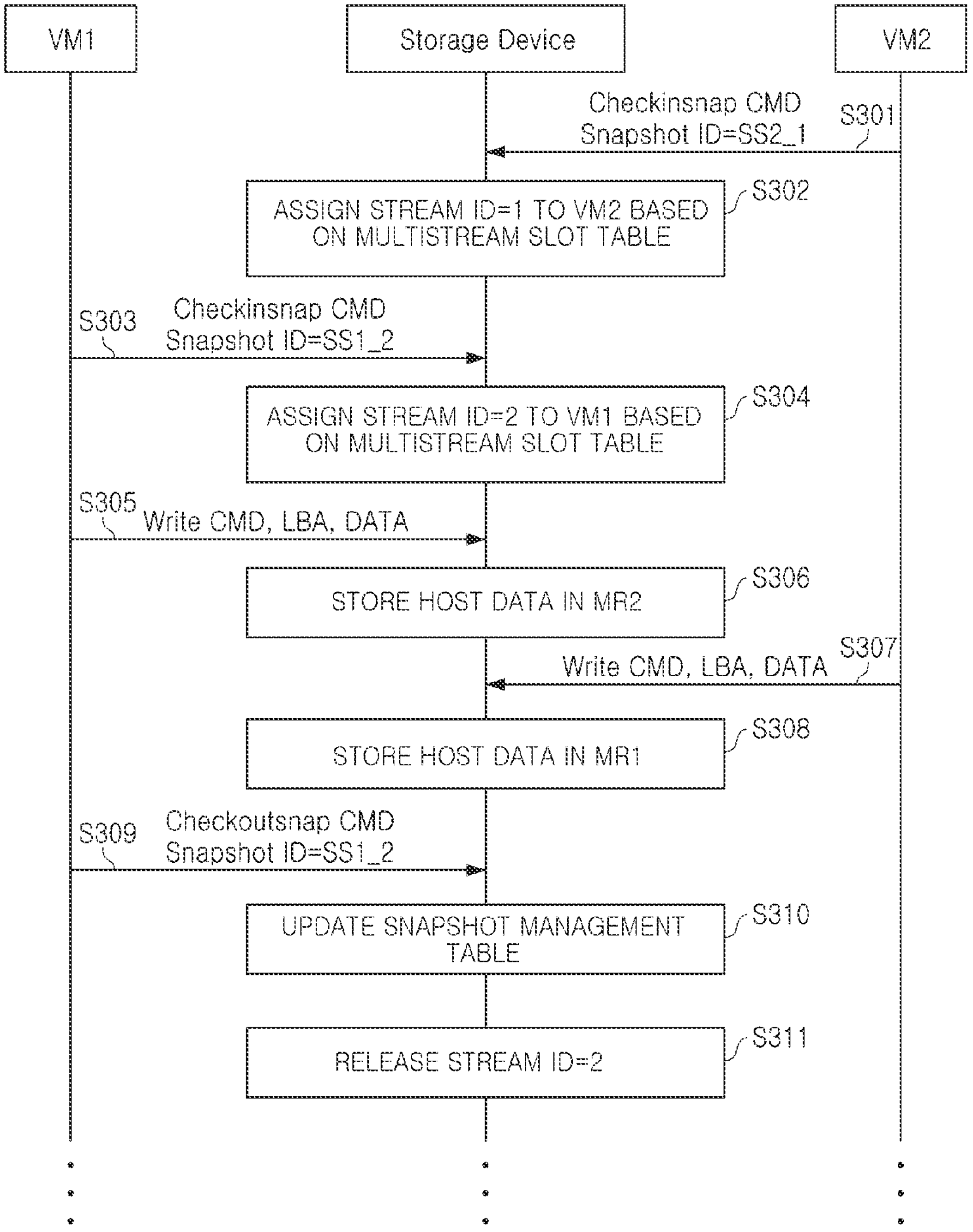
FIG. 12 is a flowchart diagram illustrating an interaction of a host-storage system according to an embodiment of the present disclosure.

FIG. 12 illustrates an interaction of a host-storage system according to an embodiment.

In operation S301, the second virtual machine VM2 may provide a check-in snapshot command, together with the snapshot ID SS2_1, to the storage device 200.

In operation S302, the storage device 200 may assign a stream ID, unassigned to other virtual machines, to the second virtual machine VM2 in response to the check-in snapshot command. In the example of FIG. 12, a stream ID1 may be assigned to the second virtual machine VM2.

In operation S303, the first virtual machine VM1 may provide a check-in snapshot command, together with the snapshot ID SS1_2, to the storage device 200.

In operation S304, the storage device 200 may assign a stream ID to the first virtual machine VM1 in response to the check-in snapshot command. The storage device 200 may assign a stream ID2, unassigned to the second virtual machine VM2 or the like, to the first virtual machine VM1.

Thus, in operations S301 to S304, different stream IDs may be assigned to different virtual machines. Even when snapshot operations of different virtual machines overlap in time, data from different virtual machines may be stored in different memory regions corresponding to different stream IDs.

In operation S305, the first virtual machine VM1 may provide a write command, a logical address, and host data to the storage device.

In operation S306, the storage device 200 may store host data from the first virtual machine VM1 in a second memory region MR2 corresponding to a stream ID2.

In operation S307, the second virtual machine VM2 may provide a write command, a logical address, and host data to the storage device.

In operation S308, the storage device 200 may store the host data from the second virtual machine VM2 in the first memory region MR1 corresponding to a stream ID1.

In operation S309, the first virtual machine VM1 may provide a check-out snapshot command together with the snapshot ID SS1_2.

In operation S310, the storage device 200 may update the snapshot management table to protect data provided from the first virtual machine VM1 and stored in the second memory region MR2. For example, the storage device may store the snapshot ID SS1_2 and logical addresses of data stored in the second memory region MR2 in an entry for the first virtual machine VM1 and the stream ID2 of the snapshot management table.

In operation S311, the storage device may release the stream ID2.

Figure 13A:
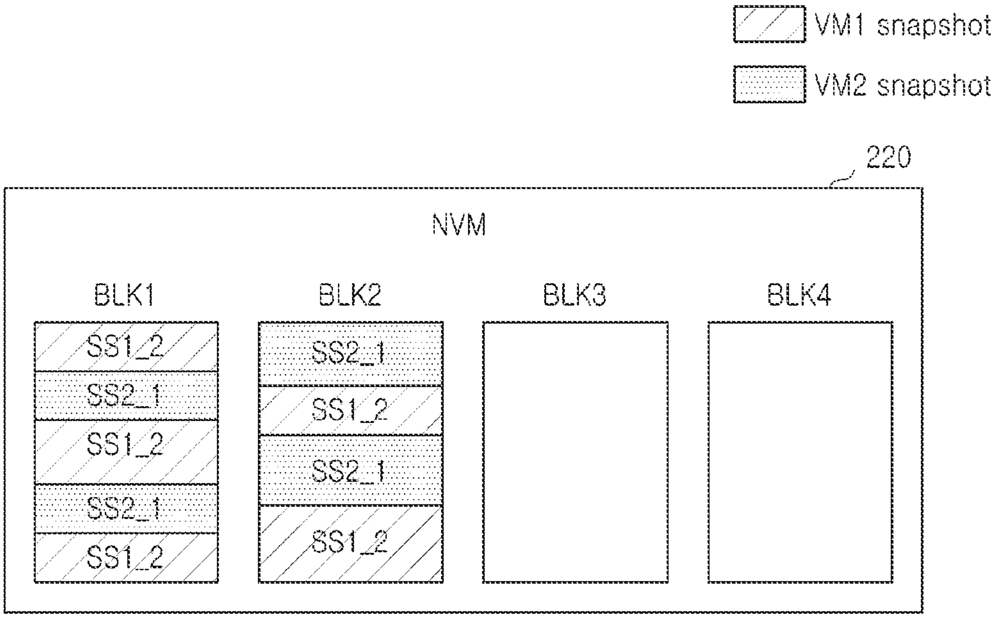
FIG. 13A is a block diagram illustrating a write amplification reduction effect according to an embodiment of the present disclosure.
Figure 13B:
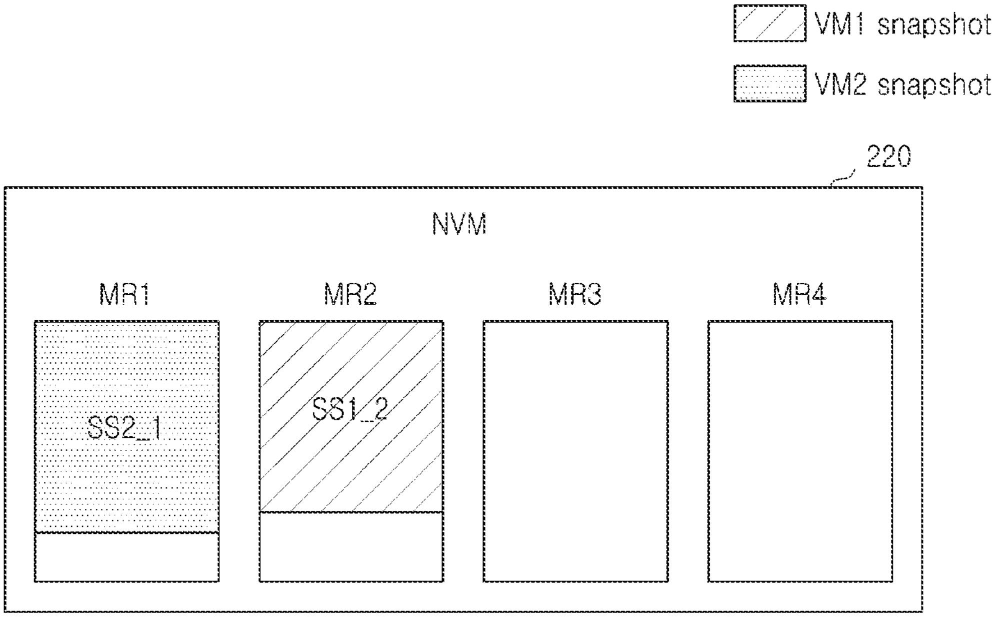
FIG. 13B is a block diagram illustrating a write amplification reduction effect according to an embodiment of the present disclosure.

FIGS. 13A and 13B illustrate a write amplification reduction effect according to an embodiment.

FIG. 13A illustrates, as a comparative example, a case in which a storage device sequentially stores a plurality of pieces of data from a plurality of virtual machines in memory blocks BLK1 to BLK4 included in a nonvolatile memory 220 without dividing the plurality of pieces of data.

As described with reference to FIG. 12, snapshot operations of the first virtual machine VM1 and the second virtual machine VM2 may overlap in time. When the snapshot operations overlap in time, data of the first virtual machine VM1 and data of the second virtual machine VM2 may be alternately received from a host. FIG. 13A illustrates a case in which data of the first virtual machine VM1 and data of the second virtual machine VM2 are not divided from each other and are programmed to memory blocks in the order received from the host.

When a plurality of pieces of data of the virtual machines are programmed in the memory block without being divided from each other, write amplification of the storage device 200 may be increased. For example, virtual machines may remove snapshots generated long before. When the virtual machine removes a snapshot, data protected by the storage device 200 may become unnecessary data and may be invalidated in memory blocks.

According to the comparative example of FIG. 13A, when data of the first virtual machine VM1 is invalidated and data of the second virtual machine VM2 is retained, invalid data and valid data are mixed in the first and second memory blocks. When invalid data is mixed in the memory blocks, data storage efficiency of the memory blocks might be reduced, and a garbage collection operation might be performed to collect valid data in a single place, so write amplification of the storage device 200 might be increased.

FIG. 13B illustrates a case, in which the storage device divides and stores a plurality of pieces of data of different virtual machines in the memory regions MR1 to MR4, according to an embodiment.

Referring to FIG. 13B, data of the first virtual machine VM1 may be stored in the second memory region MR2, and data of the second virtual machine VM2 may be stored in the first memory region MR1. When the data of the first virtual machine VM1 is invalidated and the data of the second virtual machine VM2 is retained, the data of the second memory region MR2 may be invalidated, but the data of the first memory region MR1 may be retained as valid data. Referring to FIG. 13B, when a plurality of pieces of data of different virtual machines are distinguished and stored in different memory regions, valid data may be collected in a single place even when a garbage collection operation is not performed. Accordingly, write amplification of the storage device may be reduced.

Figure 14:
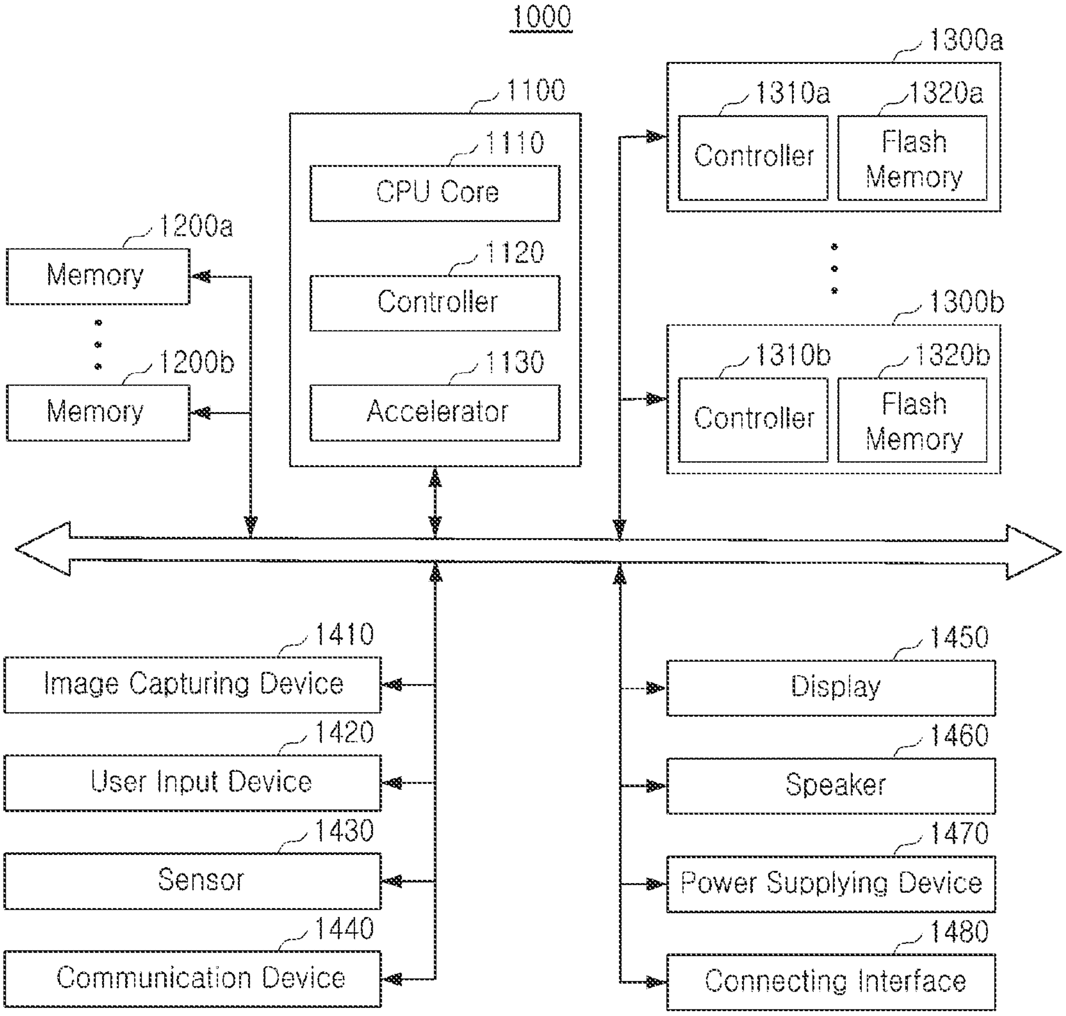
FIG. 14 is a block diagram illustrating an example of a system to which an embodiment of the present disclosure may be applied.
Figure 15:
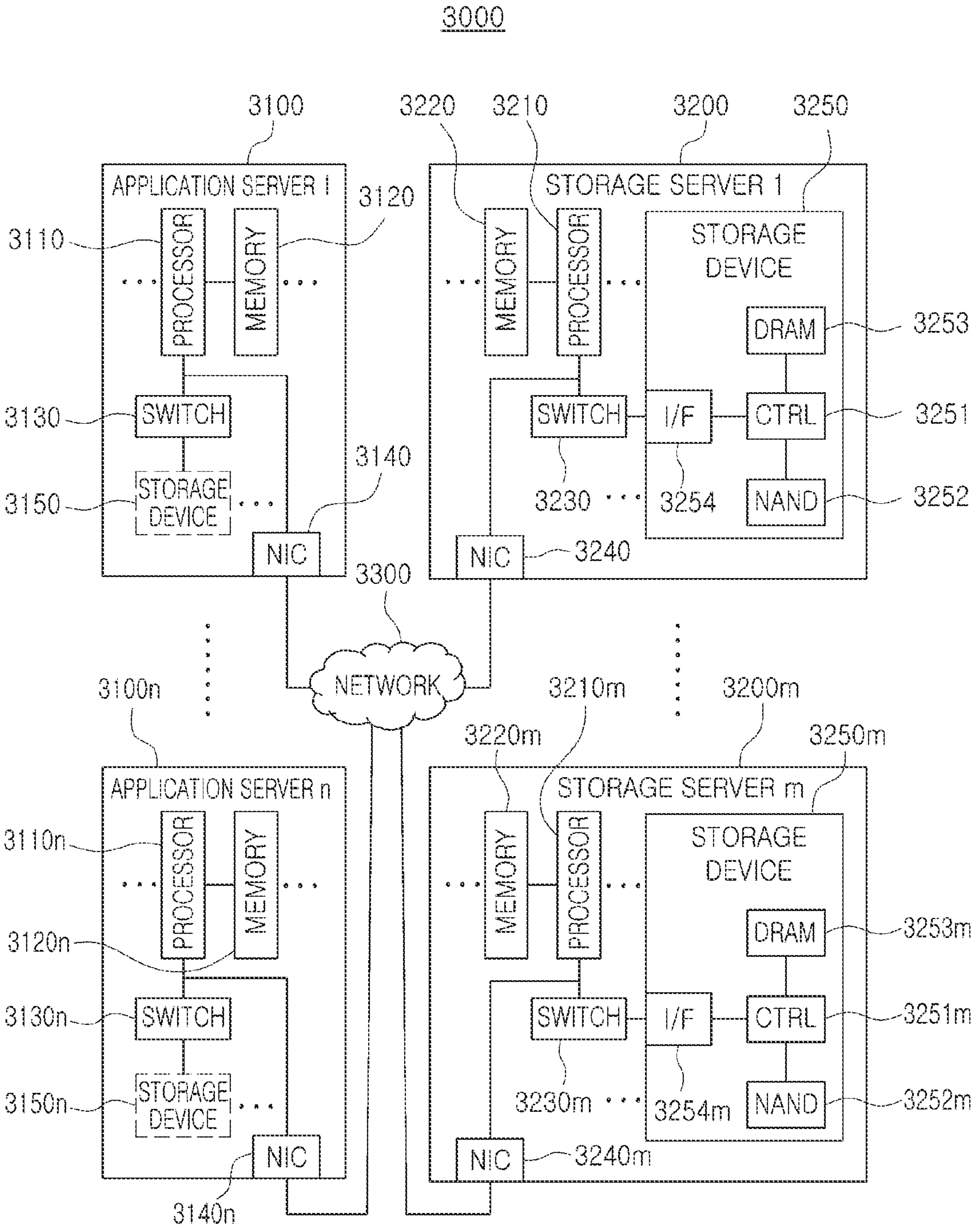
FIG. 15 is a block diagram illustrating an example of a system to which an embodiment of the present disclosure may be applied.

FIGS. 14 and 15 illustrate examples of systems to which an embodiment may be applied.

FIG. 14 illustrates a system 1000 to which a storage device according to an embodiment is applied. The system 1000 of FIG. 14 may be a mobile system such as a mobile phone, a smartphone, a tablet personal computer (PC), a wearable device, a healthcare device, an Internet of things (IoT) device, or the like. However, the system 1000 of FIG. 14 is not limited to a mobile system, and may be a personal computer, a laptop computer, a server, a media player, an automotive device such as a navigation system, or the like.

Referring to FIG. 14, the system 1000 may include a main processor 1100, memories 1200*a* and 1200*b*, and storage devices 1300*a* and 1300*b*, and may further include at least one of an image capturing device 1410, a user input device 1420, a sensor 1430, a communications device 1440, a display 1450, a speaker 1460, a power supplying device 1470, and/or a connection interface 1480.

The main processor 1100 may control the overall operation of the system 1000, in more detail, operations of other components constituting the system 1000. The main processor 1100 may be implemented as a general-purpose processor, a specific-purpose processor, or an application processor.

The main processor 1100 may include one or more CPU cores 1110 and may further include a controller 1120 controlling the memories 1200*a* and 1200*b* and/or the storage devices 1300*a* and 1300*b*. In some embodiments, the main processor 1100 may further include an accelerator 1130, a specific-purpose circuit for high-speed data operation such as artificial intelligence (AI) data operation. The accelerator 1130 may include a graphics processing unit (GPU), a neural processing unit (NPU), and/or a data processing unit (DPU), and may be implemented as an additional chip physically independent of other components of the main processor 1100.

The main processor 1100 may run a host operating system, and the host operating system may run a plurality of virtual machines. The virtual machines may operate independently of each other.

The memories 1200*a* and 1200*b* may be used as a main memory device of the system 1000 and may include a volatile memory such as a static random access memory (SRAM) and/or a dynamic random access memory (DRAM), but may include a nonvolatile memory such as a flash memory, a phase-change random access memory (PRAM), and/or a resistive random access memory (RRAM). The memories 1200*a* and 1200*b* may be implemented in the same package as the main processor 1100.

The storage devices 1300*a* and 1300*b* may function as nonvolatile storage devices storing store data regardless of whether power is supplied, and may have relatively higher storage capacity than the memories 1200*a* and 1200*b*. The storage devices 1300*a* and 1300*b* may include storage controllers 1310*a* and 1310*b* and nonvolatile memory (NVM) 1320*a* and 1320*b* storing data under the control of the storage controllers 1310*a* and 1310*b*. The nonvolatile memories 1320*a* and 1320*b* may include a flash memory having a two-dimensional (2D) structure or a three-dimensional (3D) vertical NAND (V-NAND) structure, but may include other types of nonvolatile memory such as a PRAM and/or an RRAM.

The storage devices 1300*a* and 1300*b* may be included in the system 1000 while being physically separated from the main processor 1100, or may be implemented in the same package as the main processor 1100. In addition, the storage devices 1300*a* and 1300*b* have the same shape as a solid-state device (SSD) or a memory card, and thus may be removably coupled to other components of the system 1000 through an interface such as a connection interface 1480 to be described later. The storage devices 1300*a* and 1300*b* may be devices to which a standard protocol such as universal flash storage (UFS), embedded multi-media card (eMMC), or nonvolatile memory express (NVMe) are applied, but embodiments are not limited thereto.

The storage devices 1300*a* and 1300*b* may provide a multistream function of dividing data to be stored in the nonvolatile memory into a plurality of streams and separately storing the plurality of streams in a plurality of memory regions.

According to an embodiment, the storage devices 1300*a* and 1300*b* may support a snapshot operation of a plurality of virtual machines running on the main processor 1100. The storage devices 1300*a* and 1300*b* may assign different stream IDs to the respective virtual machines in response to a check-in snapshot request of each of the virtual machines, and may separately store a plurality of pieces of data having different stream IDs in different memory regions.

The storage devices 1300*a* and 1300*b* may protect a logical region corresponding to data stored in the memory regions in response to a check-out snapshot request of respective virtual machines. In addition, the storage devices 1300*a* and 1300*b* may release the assigned stream ID in response to a check-out snapshot request of the respective virtual machines.

According to an embodiment, the storage devices 1300*a* and 1300*b* providing the multistream function may support snapshot operations of a plurality of virtual machines, so that the plurality of virtual machines may rapidly and accurately generate snapshots and may prevent write amplification of the storage devices 1300*a* and 1300*b*. In addition, the storage devices 1300*a* and 1300*b* may support snapshot operations of a larger number of virtual machines than the number of streams supported by the storage devices 1300*a* and 1300*b*.

The image capturing device 1410 may capture a still image or a video, and may be a camera, a camcorder, and/or a webcam.

The user input device 1420 may receive various types of data input from a user of the system 1000, and may include a touchpad, a keypad, a keyboard, a mouse, and/or a microphone.

The sensor 1430 may detect various types of physical quantity that may be obtained from an external entity of the system 1000, and may convert the sensed physical quantity into an electrical signal. The sensor 1430 may include a temperature sensor, a pressure sensor, an illuminance sensor, a position sensor, an acceleration sensor, a biosensor, and/or a gyroscope sensor.

The communications device 1440 may transmit and receive signals between other devices outside the system 1000 depending on various communication protocols. The communications device 1440 may be implemented to include an antenna, a transceiver, and/or a modem.

The display 1450 and the speaker 1460 may function as output devices, respectively outputting visual information and auditory information to a user of the system 1000.

The power supply device 1470 may appropriately convert power, supplied from a battery (not illustrated) embedded in the system 1000 and/or an external power supply, and may supply the power to each component of the system 1000.

The connection interface 1480 may provide a connection between the system 1000 and an external device connected to the system 1000 to exchange data with the system 1000. The connection interface 1480 may be implemented in various interface manners such as an advanced technology attachment (ATA) interface, a serial ATA, an external SATA (e-SATA), a small computer small interface (SCSI), a peripheral component interconnection (PCI) interface, a PCI express (PCI-E) interface, an IEEE 1394 interface, an universal serial bus (USB) interface, a secure digital (SD) card interface, a multimedia card (MMC) interface, an embedded multimedia card (eMMC) interface, a compact flash (CF) card interface, and the like.

FIG. 15 is a diagram illustrating a data center to which a memory device according to an embodiment is applied.

Referring to FIG. 15, a data center 3000 may be a facility collecting various types of data and providing various services, and may be referred to as a data storage center. The data center 3000 may be a system operating search engines and databases, and may be a computing system used by companies such as banks or government agencies. The data center 3000 may include application servers 3100 to 3100*n* and storage servers 3200 to 3200*m*. The number of the application servers 3100 to 3100*n* and the number of the storage servers 3200 to 3200*m* may be variously selected according to example, and the number of the application servers 3100 to 3100*n* and the number of the storage servers 3200 to 3200*m* may be different from each other.

The application server 3100 or the storage server 3200 may include at least one of the processors 3110 and 3210 and at least one of the memories 3120 and 3220. An operation of the storage server 3200 will be described as an example. The processor 3210 may control the overall operation of the storage server 3200, and may access the memory 3220 to execute instructions and/or data loaded in the memory 3220. The memory 3220 may include a double data rate (DDR) synchronous dynamic random access memory (SDRAM), a high bandwidth memory (HBM), a hybrid memory cube (HMC), a dual in-line memory module (DIMM), an Optane DIMM, and/or a nonvolatile DIMM (NVDIMM). The number of the processors 3210 and the number of the memories 3220 included in the storage server 3200 may be variously selected to meet design criteria. In an embodiment, the processor 3210 and the memory 3220 may provide a processor-memory pair. In an embodiment, the number of the processors 3210 and the number of the memories 3220 may be different from each other. The processor 3210 may include a single-core processor or a multicore processor. The above description of the storage server 3200 may be similarly applied to the application server 3100. According to an embodiment, the application server 3100 need not include the storage device 3150. The storage server 3200 may include at least one or more storage devices 3250. The number of storage devices 3250 included in the storage server 3200 may be variously selected to meet design criteria.

The application servers 3100 to 3100*n* and the storage servers 3200 to 3200*m* may communicate with each other through a network 3300. The network 3300 may be implemented using a fiber channel (FC) or an Ethernet. The FC may be a medium used for a relatively high-speed data transmission, and an optical switch providing high performance and/or high availability may be used. The storage servers 3200 to 3200*m* may be provided as file storages, block storages, or object storages according to an access scheme of the network 3300.

In an embodiment, the network 3300 may be a storage-only network such as a storage area network (SAN). For example, the SAN may be an FC-SAN using an FC network and implemented according to an FC protocol (FCP). As another example, the SAN may be an IP-SAN using a transmission control protocol/internet protocol (TCP/IP)

network and implemented according to a SCSI over TCP/IP or an Internet SCSI (iSCSI) protocol. In an embodiment, the network 3300 may be a normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), and the like.

Hereinafter, the application server 3100 and the storage server 3200 will be mainly described. A description of the application server 3100 may be applied to other application servers 3100*n*, and a description of the storage server 3200 may also be applied to other storage servers 3200*m*.

The application server 3100 may store data requested to be stored by a user or a client into one of the storage servers 3200 to 3200*m* through the network 3300. In addition, the application server 3100 may obtain data requested to be read by a user or a client from one of the storage servers 3200 to 3200*m* through the network 3300. For example, the application server 3100 may be implemented as a web server or a database management system (DBMS).

The application server 3100 may access a memory 3120*n* or a storage device 3150*n* included in the other application server 3100*n* through the network 3300, and/or may access the memories 3220 to 3220*m* or the storage devices 3250 to 3250*m* included in the storage servers 3200 to 3200*m* through the network 3300. Thus, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or via the memories 3220 to 3220*m* of the storage servers 3200 to 3200*m*. For example, the data moved through the network 3300 may be encrypted data for security or privacy.

The storage server 3200 will be described as an example. In the storage server 3200, an interface 3254 may provide a physical connection between the processor 3210 and a controller 3251, and a physical connection between a network interface card (NIC) 3240 and the controller 3251. For example, the interface 3254 may be implemented based on a direct attached storage (DAS) scheme in which the storage device 3250 is directly connected to a dedicated cable. For example, the interface 3254 may be implemented based on at least one of various interface schemes such as an advanced technology attachment (ATA), a serial ATA (SATA), an external SATA (e-SATA), a small computer system interface (SCSI), a serial attached SCSI (SAS), a peripheral component interconnect (PCI), a PCI express (PCIe), an NVMe, an IEEE 1394, a universal serial bus (USB), a secure digital (SD) card interface, a multimedia card (MMC) interface, an embedded MMC (eMMC) interface, a universal flash storage (UFS) interface, an embedded UFS (eUFS) interface, a compact flash (CF) card interface, and the like.

The storage server 3200 may further include a switch 3230 and the NIC 3240. The switch 3230 may selectively connect the processor 3210 to the storage device 3250 or may selectively connect the NIC 3240 to the storage device 3250 under the control of the processor 3210.

In an embodiment, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

In the storage servers 3200 to 3200*m* and/or the application servers 3100 to 3100*n*, a processor may transmit a command to the storage devices 3150 to 3150*n* and 3250 to 3250*m* or the memories 3120 to 3120*n* and 3220 to 3220*m* to program or read data. In this case, the data may be data of which error is corrected by an error correction code (ECC) engine. For example, the data may be processed by a data bus inversion (DBI) or a data masking (DM), and may include cyclic redundancy code (CRC) information. For example, the data may be encrypted data for security or privacy.

The storage devices 3150 to 3150*m* and 3250 to 3250*m* may transmit a control signal and command/address signals to NAND flash memory devices 3252 to 3252*m* in response to a read command received from the processor. When data is read from the NAND flash memory devices 3252 to 3252*m*, a read enable (RE) signal may be input as a data output control signal to serve to output data to a DQ bus. A data strobe signal (DQS) may be generated using the RE signal. The command and address signals may be latched in a page buffer based on a rising edge or a falling edge of a write enable (WE) signal.

The controller 3251 may control the overall operation of the storage device 3250. In an embodiment, the controller 3251 may include a static random access memory (SRAM). The controller 3251 may write data to the NAND flash memory device 3252 in response to a write command, or may read data from the NAND flash memory device 3252 in response to a read command. For example, the write command and/or the read command may be provided from the processor 3210 in the storage server 3200, the processor 3210*m* in the other storage server 3200*m*, or the processors 3110 to 3110*n* in the application servers 3100 to 3100*n*. A DRAM 3253 may temporarily store (e.g., may buffer) data to be written to the NAND flash memory device 3252 or data read from the NAND flash memory device 3252. In addition, the DRAM 3253 may store metadata. The metadata may be data generated by the controller 3251 to manage user data or the NAND flash memory device 3252. The storage device 3250 may include a secure element 3255 for security or privacy.

According to an embodiment, the application server 3100 may run a plurality of virtual machines, and the storage server 3200 may provide a multistream function. The storage server 3200 may support rapid and accurate snapshot operations of the plurality of virtual machines using a multistream function.

As described above, embodiments may provide configurations and operations associated with a storage device providing a multistream function.

According to an embodiment, a storage device may associate different stream IDs for each virtual machine in response to a request of each of the virtual machines, and may separately store a plurality of pieces of data of the virtual machines in a nonvolatile memory to prevent write amplification of the storage device.

According to an embodiment, the storage device may protect data corresponding to a virtual machine in response to a request of each of the virtual machines to prevent the data from being modified or erased, and thus, may support rapid and accurate snapshot operations of virtual machines.

According to an embodiment, the storage device may temporarily assign a stream ID in response to a request of a virtual machine, and thus may support snapshot operations of a plurality of virtual machines using a limited number of stream IDs.

While embodiments have been shown and described above to facilitate description by way of example, it will be apparent to those of ordinary skill in the pertinent art that modifications and variations may be made to these and other embodiments without departing from the scope of the present inventive concept as defined by the appended claims.

What is claimed is:

1. An electronic system comprising:

a host configured to run a plurality of virtual machines; and a storage device including a plurality of memory regions and configured to provide a multistream function of dividing data from the host into a plurality of streams and separately storing the plurality of streams in the plurality of memory regions, wherein the storage device assigns a first stream identifier (ID) to a first virtual machine, among the plurality of virtual machines, in response to a check-in snapshot command of the first virtual machine, and stores data in a first memory region corresponding to the first stream ID, among the plurality of memory regions, in response to a write command of the first virtual machine, wherein the first virtual machine provides a check-out snapshot command to the storage device and generates first snapshot information indicating logical addresses of the data, and wherein the storage device stores snapshot management information including the logical addresses of the data in response to the check-out snapshot command and releases the assignment of the first stream ID.

2. The electronic system of claim 1, wherein:

the storage device stores a multistream slot table indicating whether a determined number of stream IDs are each assigned to a virtual machine, and assigns a stream ID, unassigned to any virtual machine, as the first stream ID based on the multistream slot table.

3. The electronic system of claim 2, wherein:

the storage device updates the multistream slot table after releasing the assignment of the first stream ID.

4. The electronic system of claim 2, wherein:

the number of the plurality of virtual machines, running on the host, is larger than the determined number of the stream IDs.

5. The electronic system of claim 1, wherein:

the storage device retains data stored in the first memory region at a point in time, at which the check-out snapshot command is provided, based on the snapshot management information.

6. The electronic system of claim 5, wherein:

the storage device receives a write command, data, and a logical address from the host and, when the received logical address is included in the snapshot management information, provides a failure response to the host to prevent overwriting data stored in the first memory region.

7. The electronic system of claim 5, wherein:

the first virtual machine returns the data to a point in time, at which the check-out snapshot command is provided, using the first snapshot information and accesses the data, retained in the first memory region, using logical addresses indicated by the first snapshot information.

8. The electronic system of claim 1, wherein:

at least one of the check-in snapshot command or the check-out snapshot command further include an ID of a snapshot, the snapshot management information further includes an ID of the first virtual machine, the first stream ID, and the ID of the snapshot, and the data in the first memory region corresponds to the ID of the snapshot.

9. The electronic system of claim 1, wherein:

the storage device receives a check-in snapshot command of a second virtual machine, among the plurality of virtual machines, and, when the first stream ID is assigned to the first virtual machine, assigns a second stream ID to the second virtual machine and stores data from the second virtual machine in a second memory region corresponding to the second stream ID, among the plurality of memory regions, to divide the data from the second virtual machine from the data from the first virtual machine, and each of the first and second memory regions includes a different memory block.

10. The electronic system of claim 1, wherein:

the first virtual machine updates data included in the first snapshot information after generating the first snapshot information, assigns logical addresses, different from the logical addresses of the data, to the updated data, and provides a write command together with the assigned logical addresses and the updated data after providing a check-in snapshot command to the storage device, and the logical addresses of the updated data correspond to a third memory region that includes a different memory block than the first memory region.

11. The electronic system of claim 10, wherein:

the first virtual machine provides a check-out snapshot command to the storage device, and generates second snapshot information indicating logical addresses of the updated data.

12. A storage device comprising:

a memory device including a plurality of memory regions; and a controller configured to provide a multistream function of dividing data from a host into a plurality of streams and separately storing the plurality of streams in the plurality of memory regions, wherein the controller assigns different stream identifiers (IDs) to a plurality of virtual machines running on the host and performing snapshot operations overlapping each other in time, wherein the controller temporarily assigns a respective stream ID to each of the plurality of virtual machines in response to a check-in snapshot command and releases the temporarily assigned stream ID in response to a check-out snapshot command, and separately stores a plurality of pieces of data from the plurality of virtual machines in the plurality of memory regions based on the stream IDs, wherein each of the plurality of memory regions includes a different memory block.

13. The storage device of claim 12, wherein:

the controller stores a multistream slot table indicating whether a determined number of stream IDs are each assigned to a virtual machine, and assigns different stream IDs to the plurality of virtual machines based on the multistream slot table.

14. The storage device of claim 13, wherein:

the controller updates the multistream slot table to indicate that a released stream ID is unassigned in response to the check-out snapshot command from each of the plurality of virtual machines.

15. The storage device of claim 14, wherein:

the controller stores the logical addresses corresponding to the data as snapshot management information in response to the check-out snapshot command.

16. The storage device of claim 15, wherein:

when a write command for a logical address included in the snapshot management information is received from the host, the controller outputs a failure response to the write command to prevent overwriting data stored at a point in time at which the check-out snapshot command is provided.

17. A storage device comprising:

a memory device including a plurality of memory regions; and a controller configured to provide a multistream function of dividing data from a host into a plurality of streams and respectively storing the plurality of streams in the plurality of memory regions, wherein the controller assigns a stream identifier (ID) to a virtual machine running on the host in response to a check-in snapshot command from the virtual machine, stores data of the virtual machine in a memory region corresponding to the stream ID, among the plurality of memory regions, in response to a write command from the virtual machine, stores logical addresses corresponding to the data as snapshot management information in response to a check-out snapshot command from the virtual machine, and, when a write command for a logical address included in the snapshot management information is received from the host, outputs a failure response to the write command to prevent overwriting data stored at a point in time at which the check-out snapshot command is provided.

18. The storage device of claim 17, wherein:

the controller assigns a stream ID unassigned to any virtual machine, among a determined number of stream IDs, to the virtual machine.

19. The storage device of claim 18, wherein:

the controller separately stores a plurality of pieces of data from virtual machines, to which different stream IDs are assigned, in different memory regions among the plurality of memory regions.

* * * * *